US012608839B2

(12) United States Patent
Huang et al.

(10) Patent No.: US 12,608,839 B2
(45) Date of Patent: Apr. 21, 2026

(54) POSE DETERMINING METHOD AND RELATED DEVICE

(71) Applicant: HUAWEI TECHNOLOGIES CO., LTD., Shenzhen (CN)

(72) Inventors: Zhen Huang, Shenzhen (CN); Jinxue Liu, Shenzhen (CN); Jun Cao, Shenzhen (CN); Er Li, Hangzhou (CN); Wensen Feng, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 369 days.

(21) Appl. No.: 18/361,010

(22) Filed: Jul. 28, 2023

(65) Prior Publication Data

US 2023/0368417 A1 Nov. 16, 2023

Related U.S. Application Data

(63) Continuation of application No. PCT/CN2022/073944, filed on Jan. 26, 2022.

(30) Foreign Application Priority Data

Jan. 30, 2021 (CN) .......................... 202110134812.5

(51) Int. Cl.
*G06K 9/00* (2022.01)
*G06T 7/73* (2017.01)
*G06V 10/54* (2022.01)

(52) U.S. Cl.
CPC ............... *G06T 7/73* (2017.01); *G06V 10/54* (2022.01)

(58) Field of Classification Search
CPC ............. G06T 7/73; G06T 2207/10016; G06T 2207/20084; G06T 2207/30244;
(Continued)

(56) References Cited

U.S. PATENT DOCUMENTS

2007/0027591 A1* 2/2007 Goldenberg ........ G06F 16/9537
707/E17.11
2013/0332078 A1* 12/2013 Shin ........................ G06T 17/05
345/419
(Continued)

FOREIGN PATENT DOCUMENTS

CN 103697882 A 4/2014
CN 111256701 A 6/2020
(Continued)

OTHER PUBLICATIONS

Object recognition and pose estimation using color cooccurrence histograms and geometric modeling, Staffan Ekvall et al., Elsevier, 2005, pp. 943-955 (Year: 2005).*
(Continued)

*Primary Examiner* — Jayesh A Patel

(57) ABSTRACT

The technology of this application relates to a pose determining method. The method includes obtaining a first image, when first pose information determined based on the first image meets a pose anomaly condition, displaying prompt information for indicating to photograph a target object, and obtaining, by using the target object in the target image captured by a user based on the prompt, second pose information that does not meet the pose anomaly condition. When high-precision pose information cannot be determined, pose positioning is implemented by using the target object in a scenario. In addition, in a process of determining pose information of a terminal device, prompt information for indicating the user to photograph the target object is displayed, and the user is indicated to photograph the target object, thereby avoiding that the user does not know how to operate or scan an invalid target object.

20 Claims, 20 Drawing Sheets

(58) Field of Classification Search
　　CPC ... G06T 7/70; G06T 7/40; G06T 2207/10028;
　　　　　　G06V 10/54; G06V 20/10; G06V 20/40
　　See application file for complete search history.

(56) References Cited

U.S. PATENT DOCUMENTS

| | | | | |
|---|---|---|---|---|
| 2015/0127239 A1* | 5/2015 | Breed | .................... | G01S 19/13 |
| | | | | 701/70 |
| 2020/0372672 A1* | 11/2020 | Schonberger | ......... | G06V 20/56 |

FOREIGN PATENT DOCUMENTS

| | | | | | |
|---|---|---|---|---|---|
| CN | 111429517 A | 7/2020 | | | |
| CN | 112179330 A | 1/2021 | | | |
| JP | 2018521370 A | * | 8/2018 | .............. | G06T 7/62 |

OTHER PUBLICATIONS

Paul-Edouard Sarlin et al, "From Coarse to Fine: Robust Hierarchical Localization at Large Scale", reacharXiv:1812.03506v2 [cs. CV] Apr. 8, 2019, total 15 pages.
Torsten Sattler et al, "Efficient and Effective Prioritized Matching for Large-Scale Image-Based Localization", IEEE Transactions on Pattern Analysis and Machine Intelligence (TPAMI) (2016), total 14 pages.
Extended European Search Report for EP Application No. 22745260 dated May 23, 2024, 9 pages.

\* cited by examiner

Antenna 1        Terminal 100        Antenna 2

Terminal               Server

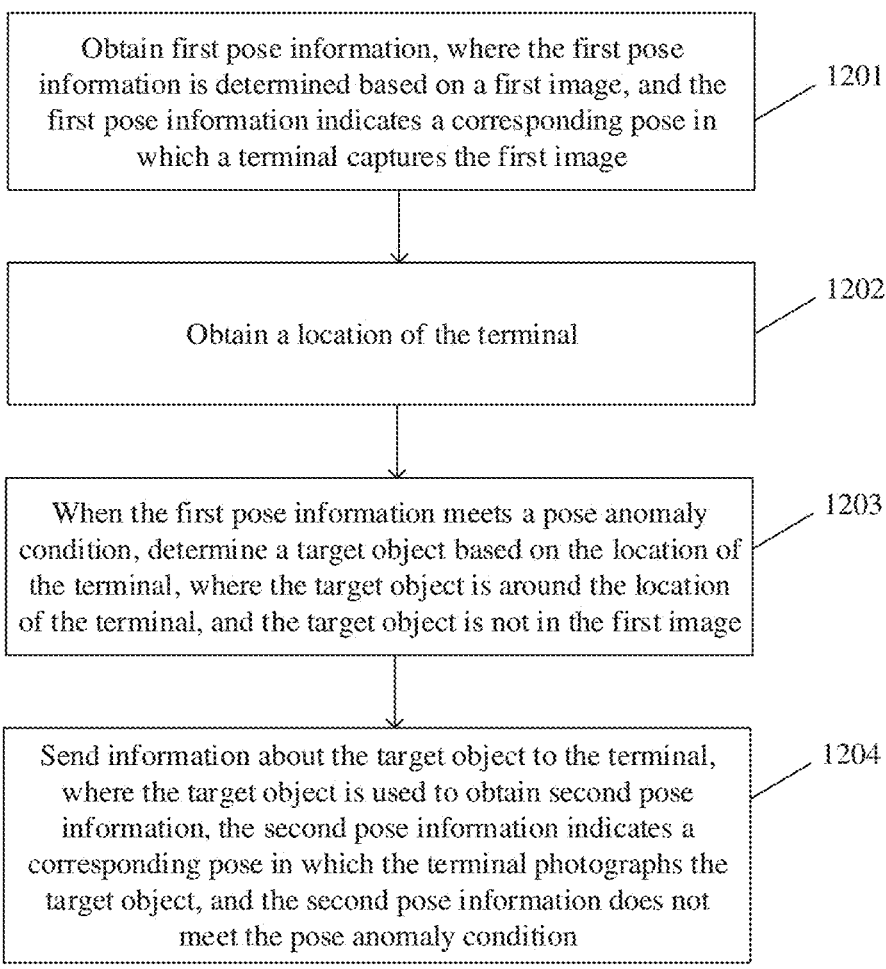

Obtain first pose information, where the first pose information is determined based on a first image, and the first pose information indicates a corresponding pose in which a terminal captures the first image — 1201

Obtain a location of the terminal — 1202

When the first pose information meets a pose anomaly condition, determine a target object based on the location of the terminal, where the target object is around the location of the terminal, and the target object is not in the first image — 1203

Send information about the target object to the terminal, where the target object is used to obtain second pose information, the second pose information indicates a corresponding pose in which the terminal photographs the target object, and the second pose information does not meet the pose anomaly condition — 1204

FIG. 12

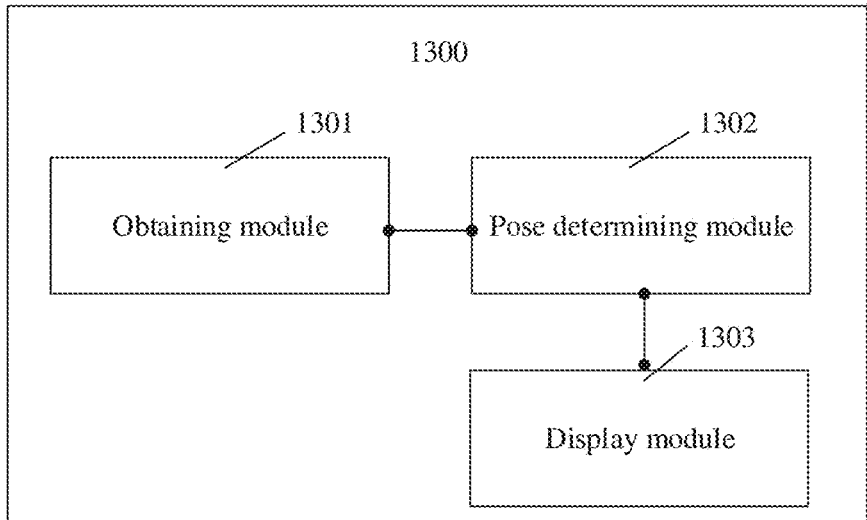

1300

Obtaining module — 1301

Pose determining module — 1302

Display module — 1303

POSE DETERMINING METHOD AND RELATED DEVICE

CROSS-REFERENCE TO RELATED APPLICATIONS

This application is a continuation of International Application No. PCT/CN2022/073944, filed on Jan. 26, 2022, which claims priority to Chinese Patent Application No. 202110134812.5, filed on Jan. 30, 2021. The disclosures of the aforementioned applications are hereby incorporated by reference in their entireties.

TECHNICAL FIELD

This application relates to the image processing field, and in particular, to a pose determining method and a related device.

BACKGROUND

A problem to be resolved by a visual localization technology is how to accurately locate a location and a pose of a camera in the real world by using images or videos captured by the camera. Visual positioning is a hot issue in the computer vision field in recent years, and is very challenging. It is of great significance in augmented reality, interactive virtual reality, robot visual navigation, public scene monitoring, intelligent transportation, and other fields. A current positioning algorithm mainly relies on a global visual feature to perform image retrieval to determine a candidate frame, performs feature matching based on a local visual feature, determines a correspondence between a 2D key point of an image and a 3D point cloud, and then accurately estimates a pose of a camera.

An existing visual positioning solution in the industry mainly relies on a visual feature to perform image search and positioning. However, the visual feature-based solution has a poor effect in some scenarios. For example, in an indoor museum scenario, a light condition of a site is poor, and a valid feature point cannot be extracted from most areas of an image. For example, in an outdoor park scenario, a field of view is large, and a large area of an image is occupied by green plants, and an extracted feature point cannot be used as a valid matching point. The application scenarios of visual positioning have some limitations.

SUMMARY

According to a pose determining method provided in this application, when high-precision pose information cannot be determined, high-precision pose positioning is implemented by using a target object in a scenario.

According to a first aspect, this application provides a pose determining method, where the method includes:

obtaining a first image;

determining first pose information based on the first image, where the first pose information indicates a corresponding pose in which a terminal captures the first image; and when the first pose information meets a pose anomaly condition, displaying prompt information for indicating to photograph a target object, where the target object is around a location of the terminal, the target object is not in the first image, the target object is used to obtain second pose information, the second pose information indicates a corresponding pose in which the terminal photographs the target object, and the second pose information does not meet the pose anomaly condition.

In a possible implementation, the method further includes:

obtaining a target image captured by a user based on the prompt information, where the target image includes the target object; and obtaining the second pose information based on the target image.

In a possible implementation, that the target object is around a location of the terminal includes: the target object and the location of the terminal are within a preset distance range, the target object and the location of the terminal are in a same region of a map, and there is no other obstacle between the target object and the location of the terminal.

In a possible implementation, before the displaying prompt information for indicating to photograph a target object, the method further includes:

obtaining the location of the terminal;

sending the location of the terminal to a server; and receiving information that is about the target object and that is sent by the server, where the target object is determined by the server based on the location of the terminal.

In a possible implementation, before the displaying prompt information for indicating to photograph a target object, the method further includes:

obtaining the location of the terminal; and determining, from a digital map based on the location of the terminal, the target object that meets a preset condition, where the digital map includes a plurality of objects, the plurality of objects are objects around the location of the terminal, and the preset condition includes at least one of the following:

at least one object that is in the plurality of objects and that is closer to the location of the terminal;

at least one object randomly determined in the plurality of objects;

at least one object in the plurality of objects, where there is no other obstacle between the at least one object and the location of the terminal; or at least one object that is in the plurality of objects and to which the terminal needs to move from the location for a shorter distance.

In a possible implementation, the information about the target object includes at least one of the following information: a location of the target object, and an image, a name, and a category of the target object. Correspondingly, the prompt information includes at least one of the following information: the location of the target object, navigation information from the location of the terminal to the location of the target object, and the image, the name, and the category of the target object.

In a possible implementation, the target object is a landmark object that is capable of being completely photographed under a current photographing parameter of the terminal and whose physical location is relatively fixed.

In a possible implementation, the first image includes a first object, the first object is used to determine the first pose information, and a texture feature of the target object has a higher recognition degree than a texture feature of the first object.

In a possible implementation, the displaying prompt information for indicating to photograph a target object when the first pose information meets a pose anomaly condition further includes:

sending the first pose information to the server; and
receiving first information that is sent by the server and
that indicates that the first pose information meets the
pose anomaly condition, and displaying, based on the
first information, the prompt information for indicating
to photograph the target object.

In a possible implementation, the pose anomaly condition
includes:
pose information is unavailable; or
a deviation between currently determined pose information and correct pose information is greater than a
threshold.

According to a second aspect, this application provides a
pose determining method. The method includes:
obtaining first pose information, where the first pose
information is determined based on a first image, and
the first pose information indicates a corresponding
pose in which a terminal captures the first image;
obtaining a location of the terminal; and
when the first pose information meets a pose anomaly
condition, determining a target object based on the
location of the terminal, where the target object is
around the location of the terminal, and the target
object is not in the first image; and
sending information about the target object to the terminal, where the target object is used to obtain second
pose information, the second pose information indi-
cates a corresponding pose in which the terminal pho-
tographs the target object, and the second pose infor-
mation does not meet the pose anomaly condition.

In a possible implementation, the method further
includes:
obtaining a target image sent by the terminal, where the
target image includes the target object; and
obtaining the second pose information based on the target
image, and sending the second pose information to the
terminal.

In a possible implementation, the information about the
target object includes at least one of the following informa-
tion: a location of the target object, and an image, a name,
and a category of the target object.

In a possible implementation, the target object is a land-
mark object that is capable of being completely photo-
graphed under a current photographing parameter of the
terminal and whose physical location is relatively fixed.

In a possible implementation, the first image includes a
first object, the first object is used to determine the first pose
information, and a texture feature of the target object has a
higher recognition degree than a texture feature of the first
object.

In a possible implementation, the first pose information is
determined based on first 3D point cloud information cor-
responding to the first object in a digital map; or
the second pose information is determined based on
corresponding second 3D point cloud information of
the target object in the digital map, and a point cloud
density of the second 3D point cloud information is
higher than a point cloud density of the first 3D point
cloud information.

In a possible implementation, the pose anomaly condition includes:
pose information is unavailable; or
a deviation between currently determined pose informa-
tion and correct pose information is greater than a
threshold.

In a possible implementation, the determining a target
object based on the location of the terminal includes:

determining, from a digital map based on the location of
the terminal, the target object that meets a preset
condition, where the digital map includes a plurality of
objects, the plurality of objects are objects around the
location of the terminal, and the preset condition
includes at least one of the following:
at least one object that is in the plurality of objects and that
is closer to the location of the terminal;
at least one object randomly determined in the plurality of
objects;
at least one object in the plurality of objects, where there
is no other obstacle between the at least one object and
the location of the terminal; or
at least one object that is in the plurality of objects and to
which the terminal needs to move from the location for
a shorter distance.

In a possible implementation, the obtaining a first pixel
location of the target object in the target image includes:
receiving the first pixel location that is of the target object
in the target image and that is sent by the terminal.

In a possible implementation, the obtaining first location
information corresponding to the target object in the digital
map includes:
receiving the target image sent by the terminal; and
determining, based on the target image, the first location
information corresponding to the target object in the
digital map.

In a possible implementation, the obtaining first location
information corresponding to the target object in the digital
map includes:
receiving the first location information that corresponds to
the target object in the digital map and that is sent by
the terminal.

In a possible implementation, the determining the second
pose information based on the first pixel location and the
first location information includes:
obtaining a 2D-3D correspondence between the first pixel
location and the first location information, where the
2D-3D correspondence indicates a correspondence
between two-dimensional coordinates of the target
object in the target image and three-dimensional coor-
dinates of the target object in actual space; and
determining the second pose information based on the
2D-3D correspondence.

In a possible implementation, the first location informa-
tion includes a global pose in which a photographing device
photographs the target object in advance, and correspond-
ingly, the second pose information indicates a corresponding
global pose in which the terminal captures the target image.

According to a third aspect, this application provides a
pose determining apparatus. The apparatus includes:
an obtaining module, configured to obtain a first image;
a pose determining module, configured to determine first
pose information based on the first image, where the
first pose information indicates a corresponding pose in
which a terminal captures the first image; and
a display module, configured to: when the first pose
information meets a pose anomaly condition, display
prompt information for indicating to photograph a
target object, where the target object is around a loca-
tion of the terminal, the target object is not in the first
image, the target object is used to obtain second pose
information, the second pose information indicates a
corresponding pose in which the terminal photographs
the target object, and the second pose information does
not meet the pose anomaly condition.

In a possible implementation, the obtaining module is configured to:

obtain a target image captured by a user based on the prompt information, where the target image includes the target object; and obtain the second pose information based on the target image.

In a possible implementation, that the target object is around a location of the terminal includes: the target object and the location of the terminal are within a preset distance range, the target object and the location of the terminal are in a same region of a map, and there is no other obstacle between the target object and the location of the terminal.

In a possible implementation, the obtaining module is configured to:

obtain a location of the terminal.

The apparatus further includes:

a sending module, configured to send the location of the terminal to a server; and a receiving module, configured to receive information that is about the target object and that is sent by the server, where the target object is determined by the server based on the location of the terminal.

In a possible implementation, the obtaining module is configured to:

obtain a location of the terminal; and determine, from a digital map based on the location of the terminal, the target object that meets a preset condition, where the digital map includes a plurality of objects, the plurality of objects are objects around the location of the terminal, and the preset condition includes at least one of the following:

at least one object that is in the plurality of objects and that is closer to the location of the terminal;

at least one object randomly determined in the plurality of objects;

at least one object in the plurality of objects, where there is no other obstacle between the at least one object and the location of the terminal; or at least one object that is in the plurality of objects and to which the terminal needs to move from the location for a shorter distance.

In a possible implementation, the information about the target object includes at least one of the following information: a location of the target object, and an image, a name, and a category of the target object. Correspondingly, the prompt information includes at least one of the following information: the location of the target object, navigation information from the location of the terminal to the location of the target object, and the image, the name, and the category of the target object.

In a possible implementation, the target object is a landmark object that is capable of being completely photographed under a current photographing parameter of the terminal and whose physical location is relatively fixed.

In a possible implementation, the first image includes a first object, the first object is used to determine the first pose information, and a texture feature of the target object has a higher recognition degree than a texture feature of the first object.

In a possible implementation, the sending module is configured to send the first pose information to the server; the obtaining module is configured to receive first information that is sent by the server and that indicates that the first pose information meets the pose anomaly condition; and the display module is configured to display, based on the first information, the prompt information for indicating to photograph the target object.

In a possible implementation, the pose anomaly condition includes:

pose information is unavailable; or a deviation between currently determined pose information and correct pose information is greater than a threshold.

According to a fourth aspect, this application provides a pose determining apparatus. The apparatus includes:

an obtaining module, configured to obtain first pose information, where the first pose information is determined based on a first image, and the first pose information indicates a corresponding pose in which a terminal captures the first image; and obtain a location of the terminal;

a target object determining module, configured to: when the first pose information meets a pose anomaly condition, determine a target object based on the location of the terminal, where the target object is around the location of the terminal, and the target object is not in the first image; and a sending module, configured to send information about the target object to the terminal, where the target object is used to obtain second pose information, the second pose information indicates a corresponding pose in which the terminal photographs the target object, and the second pose information does not meet the pose anomaly condition.

In a possible implementation, the obtaining module is configured to:

obtain a target image sent by the terminal, where the target image includes the target object; and obtain the second pose information based on the target image, and send the second pose information to the terminal.

In a possible implementation, the information about the target object includes at least one of the following information: a location of the target object, and an image, a name, and a category of the target object.

In a possible implementation, the target object is a landmark object that is capable of being completely photographed under a current photographing parameter of the terminal and whose physical location is relatively fixed.

In a possible implementation, the first image includes a first object, the first object is used to determine the first pose information, and a texture feature of the target object has a higher recognition degree than a texture feature of the first object.

In a possible implementation, the first pose information is determined based on first 3D point cloud information corresponding to the first object in a digital map; or the second pose information is determined based on corresponding second 3D point cloud information of the target object in the digital map, and a point cloud density of the second 3D point cloud information is higher than a point cloud density of the first 3D point cloud information.

In a possible implementation, the pose anomaly condition includes:

pose information is unavailable; or a deviation between currently determined pose information and correct pose information is greater than a threshold.

In a possible implementation, the target object determining module is configured to determine, from a digital map based on the location of the terminal, the target object that meets a preset condition, where the digital map includes a plurality of objects, the plurality of objects are objects around the location of the terminal, and the preset condition includes at least one of the following:

at least one object that is in the plurality of objects and that is closer to the location of the terminal;

at least one object randomly determined in the plurality of objects;

at least one object in the plurality of objects, where there is no other obstacle between the at least one object and the location of the terminal; or at least one object that is in the plurality of objects and to which the terminal needs to move from the location for a shorter distance.

In a possible implementation, the obtaining module is configured to:

obtain a first pixel location of the target object in the target image;

obtain first location information corresponding to the target object in the digital map, where the first location information indicates a location of the target object in the digital map; and determine the second pose information based on the first pixel location and the first location information.

In a possible implementation, the obtaining module is specifically configured to:

receive the first pixel location that is of the target object in the target image and that is sent by the terminal.

In a possible implementation, the obtaining module is specifically configured to:

receive the target image sent by the terminal; and determine, based on the target image, the first location information corresponding to the target object in the digital map.

In a possible implementation, the obtaining module is specifically configured to:

receive the first location information that corresponds to the target object in the digital map and that is sent by the terminal.

In a possible implementation, the obtaining module is specifically configured to:

obtain a 2D-3D correspondence between the first pixel location and the first location information, where the 2D-3D correspondence indicates a correspondence between two-dimensional coordinates of the target object in the target image and three-dimensional coordinates of the target object in actual space; and determine the second pose information based on the 2D-3D correspondence.

In a possible implementation, the first location information includes a global pose in which a photographing device photographs the target object to obtain a first image, and correspondingly, the second pose information indicates a corresponding global pose in which the terminal captures the target image.

According to a fifth aspect, this application provides a pose determining apparatus, including a display, a camera, one or more processors, a memory, a plurality of application programs, and one or more computer programs. The one or more computer programs are stored in the memory. The one or more computer programs include instructions. When the instructions are executed by the pose determining apparatus, the pose determining apparatus is enabled to perform the steps according to any one of the first aspect and the possible implementations of the first aspect.

According to a sixth aspect, this application provides a server, including one or more processors, a memory, a plurality of application programs, and one or more computer programs. The one or more computer programs are stored in the memory. The one or more computer programs include instructions. When the instructions are executed by the one or more processors, the one or more processors are enabled to perform the steps according to any one of the second aspect and the possible implementations of the second aspect.

According to a seventh aspect, this application provides a computer storage medium, including computer instructions. When the computer instructions are run on an electronic device or a server, the steps according to any one of the first aspect and the possible implementations of the first aspect, or any one of the second aspect and the possible implementations of the second aspect are performed.

According to a eighth aspect, this application provides a computer program product. When the computer program product is run on an electronic device or a server, the steps according to any one of the first aspect and the possible implementations of the first aspect, or any one of the second aspect and the possible implementations of the second aspect are performed.

Embodiments of this application provide a pose determining method. The method includes: obtaining a first image; determining first pose information based on the first image, where the first pose information indicates a corresponding pose in which a terminal captures the first image; and when the first pose information meets a pose anomaly condition, displaying prompt information for indicating to photograph a target object, where the target object is around a location of the terminal, the target object is not in the first image, the target object is used to obtain second pose information, the second pose information indicates a corresponding pose in which the terminal photographs the target object, and the second pose information does not meet the pose anomaly condition. In this manner, when high-precision pose information cannot be determined, pose positioning is implemented by using the target object in a scenario, so that the high-precision pose information is determined based on valid information in the scenario. In addition, in a process of determining pose information of a terminal device, prompt information for indicating the user to photograph the target object is displayed, and the user is indicated to photograph the target object, thereby avoiding that the user does not know how to operate or scan an invalid target object.

BRIEF DESCRIPTION OF DRAWINGS

FIG. 12 is an example schematic diagram of a pose determining method according to an embodiment of this application;

FIG. 13 is an example schematic diagram of a structure of a pose determining apparatus according to an embodiment of this application;

DESCRIPTION OF EMBODIMENTS

The following describes embodiments of the present technology with reference to the accompanying drawings in embodiments of the present technology. Terms used in embodiments of the present technology are merely intended to explain specific embodiments of the present technology, and are not intended to limit the present technology.

The following describes embodiments of this application with reference to the accompanying drawings. A person of ordinary skill in the art may learn that, with development of technologies and emergence of a new scenario, the technical solutions provided in embodiments of this application are also applicable to a similar technical problem.

In the specification, claims, and the accompanying drawings of this application, the terms "first", "second", and the like are intended to distinguish similar objects but do not necessarily indicate a specific order or sequence. It should be understood that the terms used in such a way are interchangeable in proper circumstances, and this is merely a discrimination manner for describing objects having a same attribute in embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Figure 1:
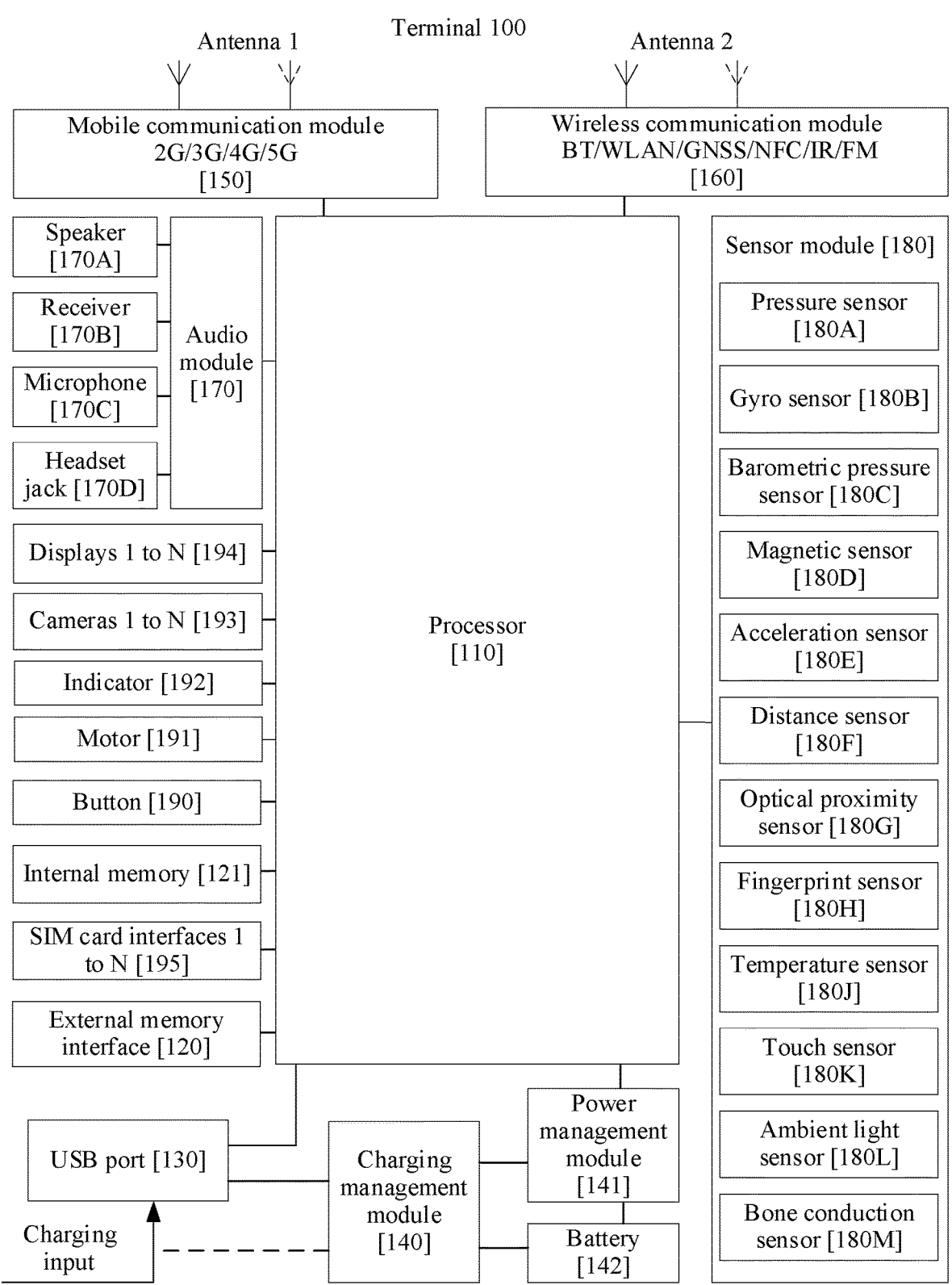
FIG. 1 is an example schematic diagram of a structure of a terminal device according to an embodiment of this application.

For ease of understanding, the following describes, by using an example, a structure of a terminal 100 provided in this embodiment of this application. Refer to FIG. 1. FIG. 1 is a schematic diagram of a structure of a terminal device according to an embodiment of this application.

As shown in the FIG. 1, the terminal 100 may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present technology does not constitute a specific limitation on the terminal 100. In some other embodiments of this application, the terminal 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on an instruction operation code and a time sequence signal, to control instruction reading and instruction execution.

A memory may be further disposed in the processor 110, and is configured to store instructions and data. In some embodiments, the memory in the processor 110 is a cache memory. The memory may store instructions or data that has been recently used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an integrated circuit (inter-integrated circuit, I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The I2C interface is a two-way synchronization serial bus, and includes a serial data line (SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be configured to: perform audio communication, and sample, quantize, and encode an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the terminal 100. The processor 110 communicates with the display 194 through the DSI interface, to implement a display function of the terminal 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, and the like. The GPIO interface may alternatively be configured as an I2C interface, an I2S interface, a UART interface, an MIPI interface, or the like.

The USB port 130 is an interface that conforms to a USB standard specification, and may be specifically a mini USB port, a micro USB port, a USB type-C port, or the like. The USB port 130 may be configured to connect to a charger to charge the terminal 100, or may be configured to transmit data between the terminal 100 and a peripheral device, or may be configured to connect to a headset for playing audio through the headset. Alternatively, the port may be configured to connect to another electronic device, for example, an AR device.

It may be understood that the interface connection relationship between the modules shown in this embodiment of the present technology is merely an example for description, and does not constitute a limitation on the structure of the terminal 100. In some other embodiments of this application, the terminal 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from the wired charger through the USB port 130. In some embodiments of wireless charging, the charging management module 140 may receive a wireless charging input by using a wireless charging coil of the terminal 100. The charging management module 140 may further supply power to the electronic device by using the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the terminal 100 may be configured to cover one or more communication frequency bands. Different antennas may be multiplexed to improve antenna utilization. For example, the antenna 1 may be multiplexed as a diversity antenna in a wireless local area network. In some other embodiments, the antennas may be used in combination with a tuning switch.

The mobile communication module 150 may provide a wireless communication solution that is applied to the terminal 100, including 2G/3G/4G/5G and the like. The mobile communication module 150 may include at least one filter, a switch, a power amplifier, a low noise amplifier (LNA), and the like. The mobile communication module 150 may receive an electromagnetic wave by using the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate the received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent device. In some other embodiments, the modem processor may be independent of the processor 110, and is disposed in a same device as the mobile communication module 150 or another functional module.

The wireless communication module 160 may provide a wireless communication solution that is applied to the terminal 100, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, and the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 of the terminal 100 is coupled to the mobile communication module 150, and the antenna 2 is coupled to the wireless communication module 160, so that the terminal 100 may communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a Beidou navigation satellite system (BDS), a quasi-zenith satellite system (QZSS), and/or a satellite based augmentation system (SBAS).

The terminal 100 may implement a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the terminal 100 may include one or N displays 194, where N is a positive integer greater than 1.

The terminal 100 may implement an image photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the terminal 100 may include one or N cameras 193, where N is a positive integer greater than 1.

The digital signal processor is configured to process a digital signal, and may process another digital signal in addition to the digital image signal. For example, when the terminal 100 selects a frequency, the digital signal processor is configured to perform Fourier transformation on frequency energy.

The video codec is configured to compress or decompress a digital video. The terminal 100 may support one or more video codecs. In this way, the terminal 100 may play or record videos in a plurality of coding formats, such as moving picture experts group (MPEG)-1, MPEG-2, MPEG-3, and MPEG-4.

The NPU is a neural-network (NN) computing processor, quickly processes input information by referring to a structure of a biological neural network, for example, by referring to a mode of transmission between human brain neurons, and may further continuously perform self-learning. Applications such as intelligent cognition of the terminal 100 may be implemented through the NPU, for example, image recognition, facial recognition, speech recognition, and text understanding.

The external memory interface 120 may be used to connect to an external memory card, for example, a micro SD card, to extend a storage capability of the terminal 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage region and a data storage region. The program storage region may store an operating system, an application required by at least one function (for example, a sound play function and an image play function), and the like. The data storage region may store data (for example, audio data and a phone book) and the like created when the terminal 100 is used. In addition, the internal memory 121 may include a high-speed random access memory, and may further include a nonvolatile memory, for example, at least one magnetic disk storage device, a flash storage device, and a universal flash storage (UFS). The processor 110 runs instructions stored in the internal memory 121 and/or instructions stored in the memory disposed in the processor, to perform various function applications and data processing of the terminal 100.

The terminal 100 may implement audio functions such as music playing and recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be configured to encode and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The terminal 100 may be used to listen to music or answer a call in a hands-free mode by using the speaker 170A.

The receiver 170B, also referred to as an "earpiece", is configured to convert an electrical audio signal into a sound signal. When a call is answered or speech information is received by the terminal 100, the receiver 170B may be put close to a human ear to listen to voice.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the terminal 100. In some other embodiments, two microphones 170C may be disposed in the terminal 100, to collect a sound signal and implement a noise reduction function. In some other embodiments, three, four, or more microphones 170C may alternatively be disposed in the terminal 100, to collect a sound signal, implement noise reduction, identify a sound source, implement a directional recording function, and the like.

The headset jack 170D is configured to connect to a wired headset. The headset jack 170D may be a USB port 130, or may be a 3.5 mm open mobile terminal platform (OMTP) standard interface or cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal 100 determines pressure intensity based on a change in the capacitance. When a touch operation is performed on the display 194, the terminal 100 detects intensity of the touch operation by using the pressure sensor 180A. The terminal 100 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyro sensor 180B may be configured to determine a motion posture of the terminal 100. In some embodiments, an angular velocity of the terminal 100 around three axes (namely, axes x, y, and z) may be determined by using the gyro sensor 180B. The gyro sensor 180B may be configured to implement image stabilization during photographing. For example, when a shutter is pressed, the gyro sensor 180B detects an angle at which the terminal 100 jitters, calculates, based on the angle, a distance for which a lens module needs to compensate, and allows a lens to cancel the jitter of the terminal 100 through reverse motion, to implement the image stabilization. The gyro sensor 180B may further be used in a navigation scenario and a somatic game scenario.

The barometric pressure sensor 180C is configured to measure barometric pressure. In some embodiments, the terminal 100 calculates an altitude based on a barometric pressure value measured by the barometric pressure sensor 180C, to assist in positioning and navigation.

The magnetic sensor 180D includes a Hall sensor. The terminal 100 may detect opening and closing of a flip leather case by using the magnetic sensor 180D. In some embodiments, when the terminal 100 is a clamshell phone, the terminal 100 may detect opening and closing of a flip cover by using the magnetic sensor 180D. Further, a feature such as automatic unlocking of the flip cover is set based on a detected opening or closing state of the leather case or a detected opening or closing state of the flip cover.

The acceleration sensor 180E may detect magnitudes of accelerations of the terminal 100 in various directions (usually on three axes). A magnitude and a direction of gravity may be detected when the terminal 100 is still. The acceleration sensor 180E may be further configured to recognize a posture of the electronic device, and is used in screen switching between a landscape mode and a portrait mode, a pedometer, or another application.

The distance sensor 180F is configured to measure a distance. The terminal 100 may measure a distance in an infrared manner or a laser manner. In some embodiments, in a photographing scenario, the terminal 100 may measure a distance by using the distance sensor 180F to implement quick focusing.

The optical proximity sensor 180G may include, for example, a light emitting diode (LED) and an optical detector, for example, a photodiode. The light-emitting diode may be an infrared light-emitting diode. The terminal 100 transmits infrared light by using the light-emitting diode. The terminal 100 detects infrared reflected light from a nearby object by using the photodiode. When sufficient reflected light is detected, it may be determined that there is an object near the terminal 100. When insufficient reflected light is detected, the terminal 100 may determine that there is no object near the terminal 100. The terminal 100 may detect, by using the optical proximity sensor 180G, that the terminal 100 held by the user is close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The terminal 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the terminal 100 is in a pocket, to avoid an accidental touch.

The fingerprint sensor 180H is configured to collect a fingerprint. The terminal 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal 100 executes a temperature processing policy by using the temperature detected by the temperature sensor 180J. For example, when the temperature reported by the temperature sensor 180J exceeds a threshold, the terminal 100 lowers performance of a processor located near the temperature sensor 180J, to reduce power consumption for thermal protection. In some other embodiments, when the temperature is lower than another threshold, the terminal 100 heats the battery 142 to avoid abnormal shutdown of the terminal 100 due to a low temperature. In some other embodiments, when the temperature is lower than still another threshold, the terminal 100 boosts an output voltage of the battery 142 to avoid abnormal shutdown caused by a low temperature.

The touch sensor 180K is also referred to as a "touch control device". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor to determine a type of the touch event. A visual output related to the touch operation may be provided on the display 194. In some other embodiments, the touch sensor 180K may alternatively be disposed on a surface of the terminal 100 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may also be disposed in the headset, to obtain a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal 100 may receive a button input, and generate a button signal input related to a user setting and function control of the terminal 100.

The motor 191 may generate a vibration prompt. The motor 191 may be configured to provide an incoming call vibration prompt or a touch vibration feedback. For example, touch operations performed on different applications (for example, photographing and audio playback) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the terminal 100. The terminal 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external storage card. The terminal 100 interacts with a network through the SIM card, to implement functions such as calling and data communication. In some embodiments, the terminal 100 uses an eSIM, namely, an embedded SIM card. The eSIM card may be embedded in the terminal 100, and cannot be separated from the terminal 100.

A software system of the terminal 100 may use a layered architecture, an event-driven architecture, a microkernel architecture, a microservice architecture, or a cloud architecture. In this embodiment of the present technology, an Android system with the layered architecture is used as an example to illustrate a software structure of the terminal 100.

Figure 2A:
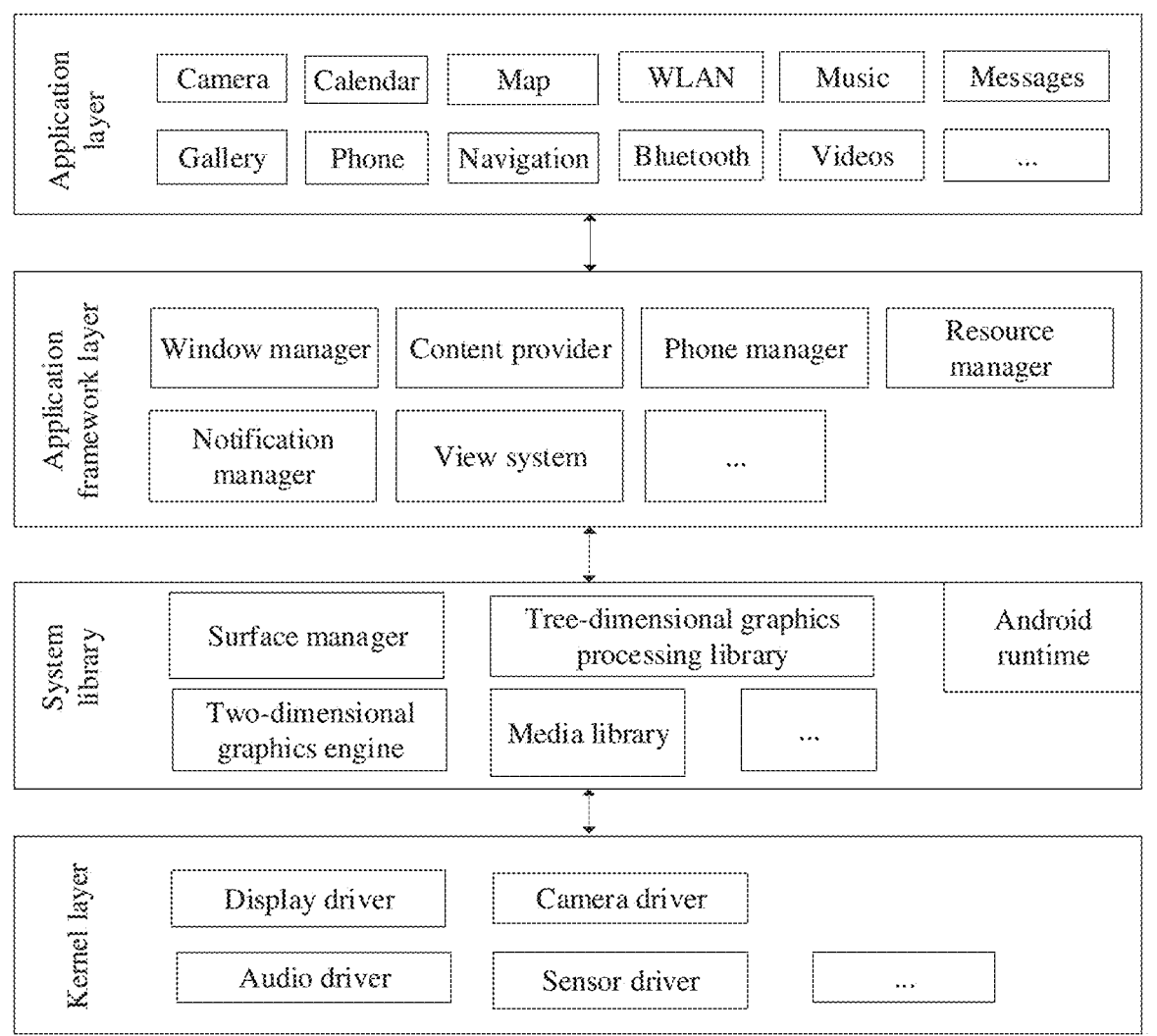
FIG. 2a is an example block diagram of a software structure of a terminal device according to an embodiment of this application.

FIG. 2a is a block diagram of the software structure of the terminal 100 according to an embodiment of this disclosure.

In a layered architecture, software is divided into several layers, and each layer has a clear role and task. The layers communicate with each other through a software interface. In some embodiments, an Android system is divided into four layers: an application layer, an application framework layer, an Android runtime and system library, and a kernel layer from top to bottom.

The application layer may include a series of application packages.

As shown in FIG. 2a, the application packages may include applications such as Camera, Gallery, Calendar, Phone, Map, Navigation, WLAN, Bluetooth, Music, Videos, and Messages.

The application framework layer provides an application programming interface (API) and a programming framework for an application at the application layer. The application framework layer includes some predefined functions.

As shown in FIG. 2a, the application framework layer may include a window manager, a content provider, a view system, a phone manager, a resource manager, a notification manager, and the like.

A window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and answered, a browsing history and bookmarks, an address book, and the like.

The view system includes visual controls such as a control for displaying a text and a control for displaying a picture. The view system may be used to construct an application. A display interface may include one or more views. For example, a display interface including a short message service message notification icon may include a view for displaying text and a view for displaying a picture.

The phone manager is configured to provide a communication function for the terminal 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is prompted in the status bar, an alert sound is played, the electronic device vibrates, or the indicator light blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes Java files of the application layer and the application framework layer as binary files. The virtual machine is configured to implement functions such as object lifecycle management, stack management, thread management, security and abnormality management, and garbage collection.

The system library may include a plurality of functional modules, for example, a surface manager, a media library, a three-dimensional graphics processing library (for example, an OpenGL ES), and a 2D graphics engine (for example, an SGL).

The surface manager is configured to manage a display subsystem, and provide fusion of 2D and 3D layers for a plurality of applications.

The media library supports playback and recording in a plurality of commonly used audio and video formats, static image files, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, compositing, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working procedure of software and hardware of the terminal 100 with reference to a photographing capture scenario.

When the touch sensor 180K receives a touch operation, a corresponding hardware interruption is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. For example, the touch operation is a single-tap operation and a control corresponding to the single-tap operation is a control of a camera application icon. A camera application invokes an interface at the application framework layer, to start the camera application. Then, the camera driver is started by invoking the kernel layer, and a static image or a video is captured by using the camera 193.

An embodiment of this application further provides a server 1300.

Figure 2B:
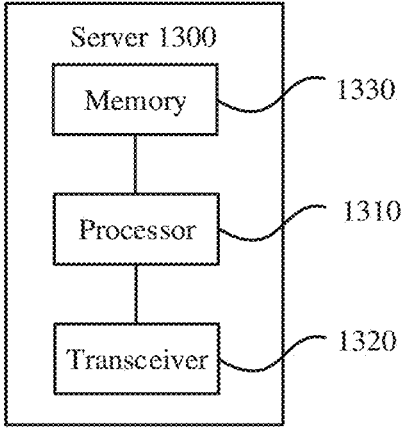
FIG. 2b is an example block diagram of a structure of a server according to an embodiment of this application.

The server 1300 may include a processor 1310 and a transceiver 1320. The transceiver 1320 may be connected to the processor 1310, as shown in FIG. 2b. The transceiver 1320 may include a receiver and a transmitter, and may be configured to receive or send a message or data. The transceiver 1320 may be a network interface card. The server 1300 may further include an acceleration component (which may be referred to as an accelerator). When the acceleration component is a network acceleration component, the acceleration component may be a network interface card. The processor 1310 may be a control center of the server 1300, and is connected to all parts of the entire server 1300, such as the transceiver 1320, through various interfaces and lines. In the present technology, the processor 1310 may be a central processing unit (Central Processing Unit, CPU). Optionally, the processor 1310 may include one or more processing units. The processor 1310 may alternatively be a digital signal processor, an application-specific integrated circuit, a field programmable gate array, a GPU, another programmable logic device, or the like. The server 1300 may further include a memory 1330. The memory 1330 may be configured to store a software program and a module. The processor 1310 reads software code and the module that are stored in the memory 1330, to perform various function applications and data processing of the server 1300.

Figure 2C:
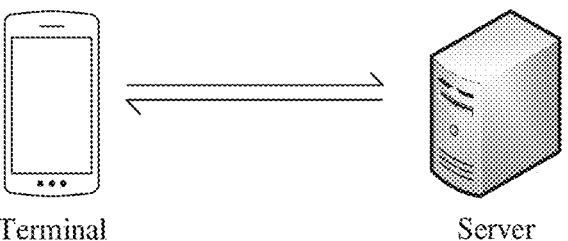
FIG. 2c is an example block diagram of a structure of a pose determining system according to an embodiment of this application.

An embodiment of this application further provides a pose determining system. As shown in FIG. 2c, the system may include a terminal device and a server. The terminal device may be a mobile terminal, a human-computer interaction device, or an in-vehicle visual perception device, for example, a mobile phone, a floor scanner, an intelligent robot, an unmanned vehicle, an intelligent monitor, or an augmented reality (AR) wearing device. Correspondingly, a method provided in embodiments of this disclosure may be applied to application fields such as human-computer interaction, in-vehicle visual perception, augmented reality, intelligent monitoring, and unmanned driving.

For ease of understanding, a pose determining method provided in embodiments of this application is specifically described with reference to the accompanying drawings and an application scenario.

Figure 3:
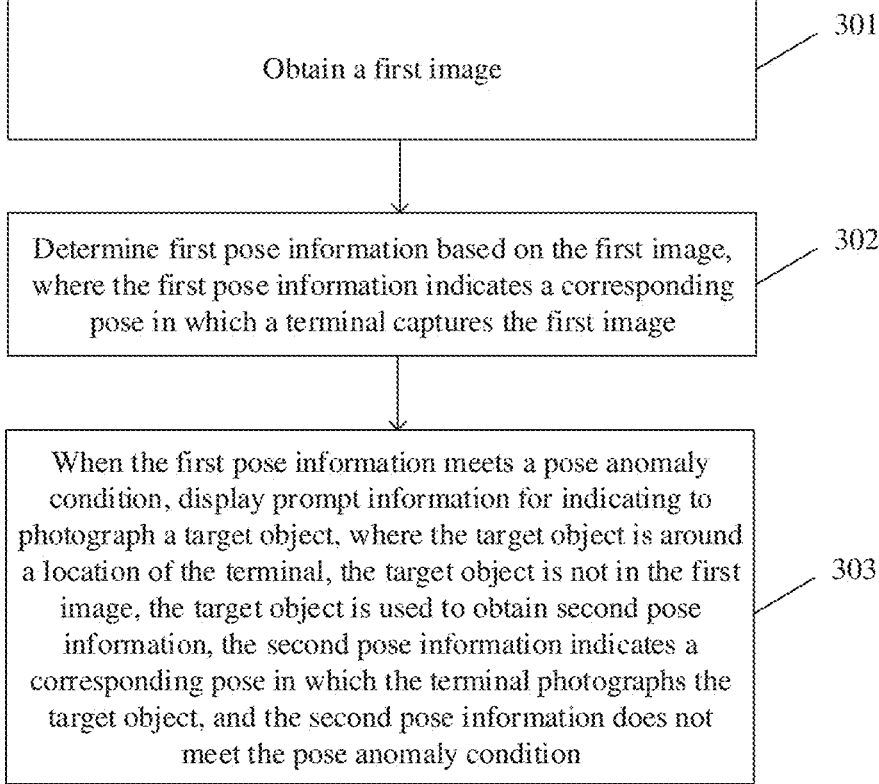
FIG. 3 is an example schematic diagram of an embodiment of a pose determining method according to embodiments of this application.

Refer to FIG. 3. FIG. 3 is a schematic diagram of an embodiment of a pose determining method according to an embodiment of this application. As shown in FIG. 3, the pose determining method provided in this application includes the following steps.

301: Obtain a first image.

In this embodiment of this application, to display an AR interface, a terminal may obtain a video stream captured by the terminal, where the first image is an image frame in the video stream captured by the terminal.

302: Determine first pose information based on the first image, where the first pose information indicates a corresponding pose in which the terminal captures the first image.

In this embodiment of this application, to display the AR interface, the terminal may obtain the video stream shot by the terminal, and obtain, based on the video stream, a corresponding pose in which the terminal photographs the video stream.

The following describes how to obtain, based on the video stream, the corresponding pose in which the terminal captures the video stream.

In an implementation, the terminal may calculate a pose of the terminal based on data obtained by a photographing device carried by the terminal and some positioning-related sensors. Alternatively, the terminal may send, to a server on the cloud side, data obtained by a photographing device carried by the terminal and some positioning-related sensors, and the server calculates a pose of the terminal, and sends the calculated pose to the terminal.

For example, the server calculates the pose information of the terminal. Specifically, the terminal device may send, to the server, obtained data such as a video stream captured by the photographing device of the terminal, location information of the terminal (for example, location information obtained based on a global positioning system (GPS) or location information obtained based on location-based services (LBS)), a historical moment simultaneous localization and mapping (SLAM) pose, and a historical moment positioning pose. The historical moment SLAM pose is an SLAM pose change that is recorded by the terminal device during online positioning before. The historical moment positioning pose is a positioning pose result that is recorded by the terminal device during online positioning before.

The server may extract an image frame from the received video stream as an input frame, then extract a global feature of the input frame, and search a digital map for an image similar to the input frame based on the global feature, to obtain a plurality of candidate frames. The found candidate frame and the input frame have a co-view relationship. The co-view relationship refers to that the found candidate frame is an image whose photographing angle difference is within Y degrees within X meters near a location of the input frame and whose photographed content has a co-view relationship with that of the input frame. X and Y may be preset values.

It should be understood that the digital map is a warehouse for organizing, storing, and managing map data. The digital map may include an image of scene map data, an image of feature data (including a global feature and a local feature), point cloud data, and 3D object data, a point cloud, and feature data (including a global feature and a local feature). The data is added to the digital map after offline registration processing. How to construct the digital map is described in a subsequent embodiment.

After obtaining the candidate frames, the server may extract a local feature of the input frame, perform image matching on the input frame and the plurality of candidate frames, to obtain a 2D-2D correspondence, and obtain matching pairs between 2D points of the candidate frames and the point cloud from the digital map, to obtain a 2D-3D correspondence between the input frame and the point cloud.

The server may calculate a pose of the input frame, namely, a preliminary pose result of the terminal device, based on the 2D-3D correspondence between the input frame and the point cloud according to a pose solution algorithm. The pose solution algorithm may include but is not limited to a pose solution algorithm for perspective of n points (pnp), a pose solution algorithm for perspective of two points (p2p), and the like.

The foregoing is described by using an example in which the server calculates the pose information of the terminal device. The following is described by using an example in which the terminal device completes calculation of the pose information of the terminal device.

The terminal device may obtain data such as a video stream captured by the photographing device of the terminal, location information of the terminal (for example, location information obtained based on a global positioning system (GPS) or location information obtained based on location-based services (LBS)), a historical moment simultaneous localization and mapping (SLAM) pose, and a historical moment positioning pose. The terminal device extracts an image frame from the received video stream as an input frame, then extracts a global feature of the input frame, and searches a digital map for an image similar to the input frame based on the global feature, to obtain a plurality of candidate frames. After obtaining the candidate frames, the terminal device may extract a local feature of the input frame, perform image matching on the input frame and the plurality of candidate frames, to obtain a 2D-2D correspondence, and obtain matching pairs between 2D points of the candidate frames and the point cloud from the digital map, to obtain a 2D-3D correspondence between the input frame and the point cloud. The terminal device may calculate a pose of the input frame based on the 2D-3D correspondence between the input frame and the point cloud according to a pose solution algorithm.

It should be noted that the pose in this embodiment of this application may include three-dimensional location coordinates, a yaw angle, a pitch angle, and a roll angle at which the terminal device captures an image.

When the corresponding pose in which the video stream is captured is obtained, the augmented reality AR interface may be displayed based on the corresponding pose in which the video stream is captured. The AR interface may include a preview stream corresponding to the video stream. Specifically, after obtaining the corresponding pose in which the video stream is captured, the terminal may display the AR interface based on the pose. The AR interface may include an image (the preview stream) of an environment in which the terminal device is currently located and an identifier generated based on pose information of the terminal device. For example, if the AR interface is an AR navigation interface, the identifier may be a navigation guide. If the AR interface is a scenario explanation AR interface, for example, an exhibit explanation interface in a museum, the identifier may be an indication mark of an exhibit.

In this embodiment of this application, the first image is a frame in the video stream. The corresponding pose in which the video stream is captured includes the first pose information. The first pose information indicates the corresponding pose in which the terminal captures the first image.

303: When the first pose information meets a pose anomaly condition, display prompt information for indicating to photograph a target object, where the target object is around a location of the terminal, the target object is not in the first image, the target object is used to obtain second pose information, the second pose information indicates a corresponding pose in which the terminal photographs the target object, and the second pose information does not meet the pose anomaly condition.

In some scenarios, due to an environment in which a video is captured, a valid feature point cannot be extracted from the extracted input frame. For example, in some indoor scenarios, such as a museum and an art exhibition hall, in which a site environment has a poor illumination condition and most walls and floors have weak textures and repeated textures, a valid visual feature point cannot be extracted. In some outdoor scenarios, such as parks and large squares, in which most of an environment is green plants and there are no obvious buildings, extracted visual feature points cannot be used for positioning.

Specifically, in this embodiment, the terminal may display the AR interface based on the corresponding pose in which the video stream is captured. However, when calculating the pose corresponding to the first image in the video stream, due to an environment in which the terminal is located when the first image is photographed, pose precision of the obtained pose calculation result (the first pose information) meets the pose anomaly condition. The pose anomaly condition may include: pose information is unavailable; or a deviation between currently determined pose information and correct pose information is greater than a threshold.

That pose information is unavailable may be understood as that the pose information cannot be obtained within time T1, or the pose information cannot be calculated based on an image. For example, the terminal cannot receive, within the time T1, the pose information calculated by the server, or the terminal receives an indication that the pose information cannot be calculated and that is fed back by the server, or the terminal cannot calculate the pose information based on the image. It should be understood that T1 may be preset time, and T1 may be a value from 0 seconds to 0.5 seconds. For example, T1 may be 0.1 seconds or 0.3 seconds.

The correct pose information may be understood as pose information that can be calculated by the server based on a standard digital map, and the correct pose information may objectively and correctly indicate a current pose of the terminal.

That a deviation between currently determined pose information and correct pose information is greater than a threshold may be understood as that the deviation between the currently determined pose information and a current correct pose of the terminal is excessively large. In an implementation, an example in which a pose is represented based on 6 degrees of freedom (6DOF) is used. A corresponding threshold may be set for each degree of freedom, or a corresponding threshold may be set for a location coordinate point (including an X coordinate, a Y coordinate, and a Z coordinate), and a corresponding threshold is set for remaining angle information (a yaw angle $\theta 1$, a pitch angle $\theta 2$, and a roll angle $\theta 3$). Specifically, for the X coordinate and the Y coordinate, the corresponding threshold may be set to a value from 0 m to 2 m. For example, for the X coordinate and the Y coordinate, the corresponding threshold may be set to 0.5 m or 1 m. For the Z coordinate, the corresponding threshold may be set to a value from 0 m to 0.5 m. For example, for the Z coordinate, the corresponding threshold may be set to 0.1 m or 0.25 m. For the yaw angle $\theta 1$, the pitch angle $\theta 2$, and the roll angle $\theta 3$, the corresponding threshold may be set to a value from 0 degrees to 10 degrees. For example, for the yaw angle $\theta 1$, the pitch angle $\theta 2$, and the roll angle $\theta 3$, the corresponding threshold may be set to 5 degrees or 4 degrees. In this case, when a deviation between any degree of freedom in the six degrees of freedom and a corresponding correct pose value exceeds a corresponding threshold, it is considered that the deviation between the currently determined pose information and the correct pose information is greater than the threshold; or when a deviation between several specified degrees of freedom in the six degrees of freedom and a corresponding correct pose value exceeds a corresponding threshold, it is considered that the deviation between the currently determined pose information and the correct pose information is greater than the threshold.

In an implementation, in addition to the pose information, the pose calculation result may include confidence corresponding to the pose information. The confidence may be determined based on a reprojection error, a quantity of interior points, or the like. This is not limited in this embodiment of this application. When the confidence is excessively low, it may be considered that the deviation between the currently determined pose information and the correct pose information is greater than the threshold. For example, it is assumed that a full confidence score is 1.0. When the confidence is less than 0.6, it is considered that the deviation between the currently determined pose information and the correct pose information is greater than the threshold; or when the confidence is less than 0.7, it is considered that the deviation between the currently determined pose information and the correct pose information is greater than the threshold.

In the foregoing scenario, there is usually an object having a significant visual feature (the significant visual feature means that a visual texture feature of the object has a high recognition degree. Specifically, that the texture feature has a high recognition degree means that there are a small quantity of objects having a same texture feature as the target object in the world, and the target object can be determined based on the texture feature of the target object), for example, a museum relics or a sculpture in a park. Using these objects as positioning targets can greatly improve a positioning success rate. However, in an existing digital map modeling process, a video sequence of a large-scale scenario is collected along a fixed route, and then a sparse point cloud of the scenario is generated through offline processing. For a single object, there is only a small quantity of sparse point clouds, and a requirement for 3D object positioning cannot be met. Therefore, a 3D object may be separately collected and processed offline to generate dense data such as a point cloud and an image.

In an implementation, the server may determine the calculated preliminary pose result (the first pose information). If the first pose information meets the pose anomaly condition, the server may determine, from the digital map based on the location of the terminal, an object (referred to as the target object in this embodiment) around the terminal, and send information including the target object to the terminal. The being around the terminal may be understood as that the target object and the location of the terminal are within a preset distance range. Due to a short distance, the user may easily move to a location near the target object. The being around the terminal may alternatively be understood as that the target object and the location of the terminal are in a same region of a map. For example, in a museum scenario, both the target object and the first object are in a museum, and the user may easily move to a location near the target object. The being around the terminal may alternatively be understood that there is no other obstacle between the target object and the location of the terminal.

Specifically, the digital map may include pre-collected information about a plurality of objects. The information may include but is not limited to locations of the objects, images of the objects, a point cloud of the objects, and the like. When determining that real-time pose precision of the terminal device meets the pose anomaly condition, the server may obtain, from the digital map, objects (including the target object) around the location of the terminal, and send information indicating these objects to the terminal, so that the terminal may display the information about these objects on a target interface. Further, the terminal may capture a target image including these objects, and re-determine a pose based on the target image.

It should be understood that the target object is not in the first image. In an implementation, the first image does not include any part of the target object. In an implementation, the first image includes only a part of the target object, the other part of the target object is not in the first image, and the part of the target object included in the first image is insufficient to determine location information of the terminal.

Specifically, the digital map may include 3D point cloud information of a plurality of objects. The first object corresponds to first 3D point cloud information in the digital map. The target object corresponds to the second 3D point cloud information in the digital map. A point cloud density of the second 3D point cloud information is higher than a point cloud density of the first 3D point cloud information.

In this embodiment of this application, the target object is a landmark object that is capable of being completely photographed under a current photographing parameter of the terminal and whose physical location is relatively fixed. The being capable of being completely photographed under a current photographing parameter of the terminal may be understood as that the target object is a small and medium—sized object, and the user can capture a full image of the target object under the current photographing parameter of the terminal. That the physical location is relatively fixed does not mean that the target object cannot be moved, but means that the target object is in a static state relative to the ground in a natural state. For example, in a museum scenario, the target object may be an exhibit.

In an implementation, the digital map includes a plurality of objects around the location of the terminal. The server or the terminal may select at least one object (including the target object) from the plurality of objects based on a preset condition. The following describes how to select the at least one object from the plurality of objects based on the preset condition.

In this embodiment of this application, the target object that meets the preset condition may be determined from the digital map based on the location of the terminal, where the digital map includes a plurality of objects, the plurality of objects are objects around the location of the terminal, and the preset condition includes at least one of the following:

at least one object that is in the plurality of objects and that is closer to the location of the terminal;

at least one object randomly determined in the plurality of objects;

at least one object in the plurality of objects, where there is no other obstacle between the at least one object and the location of the terminal; or at least one object that is in the plurality of objects and to which the terminal needs to move from the location for a shorter distance.

To allow the user carrying the terminal to conveniently move to the location near the target object, at least one object closer to the location of the terminal may be selected from the plurality of objects. Alternatively, at least one object may be selected from the plurality of objects, where there is no other obstacle between the at least one object and the location of the terminal. Alternatively, at least one object that is in the plurality of objects and to which the terminal needs to move from the location for a shorter distance may be selected from the plurality of objects.

More specifically, the server may send a target interface display indication to the terminal device, where the target interface display indication may include information about the target object. Correspondingly, the terminal device may display the prompt information for indicating to photograph the target object.

In an implementation, the terminal device may calculate the first pose information, and determine the calculated preliminary pose result (the first pose information). If the first pose information meets the pose anomaly condition, for example, the first pose information fails to be solved or a deviation between the pose precision of the first pose information and a correct value is greater than a threshold, the terminal device may determine, from the digital map based on the location of the terminal device, an object (referred to as the target object in this embodiment) located within a specific distance from the terminal. Alternatively, the terminal device may determine the calculated preliminary pose result (the first pose information). If the first pose information meets the pose anomaly condition, the terminal device may send, to the server, an indication that pose precision meets the pose anomaly condition. The server may determine, from the digital map, an object (referred to as the target object in this embodiment) located within a specific distance from the terminal, and send information including the target object to the terminal.

The following describes how the terminal device displays the prompt information for indicating to photograph the target object.

In an implementation, the terminal device may receive the information that is about the target object and that is sent by the server.

In this embodiment of this application, the information about the target object may include a location of the target object. Correspondingly, the terminal device may display the location of the target object, or display navigation information from the location of the terminal to the location of the target object. The information about the target object may further include an image, a name, and/or a category of the target object. Correspondingly, the terminal device may display the image, the name, and/or the category of the target object. The image may be obtained by photographing the target object in advance, and the name may be a specific name of the target object. For example, in a museum scenario, the name of the target object may be a name of an exhibit, a sequence number of the exhibit, a category of the exhibit, or the like.

It should be understood that the server may send, to the terminal device, information about the plurality of objects near the location of the terminal device. The target object is one of the plurality of objects. Correspondingly, the target interface may include a plurality of pieces of information for indicating the target object, and the user may select one of the plurality of objects.

In an implementation, the terminal device may obtain the information about the target object from the digital map.

Figure 4A:
FIG. 4a is an example schematic diagram of a terminal interface according to an embodiment of this application.
Figure 4B:
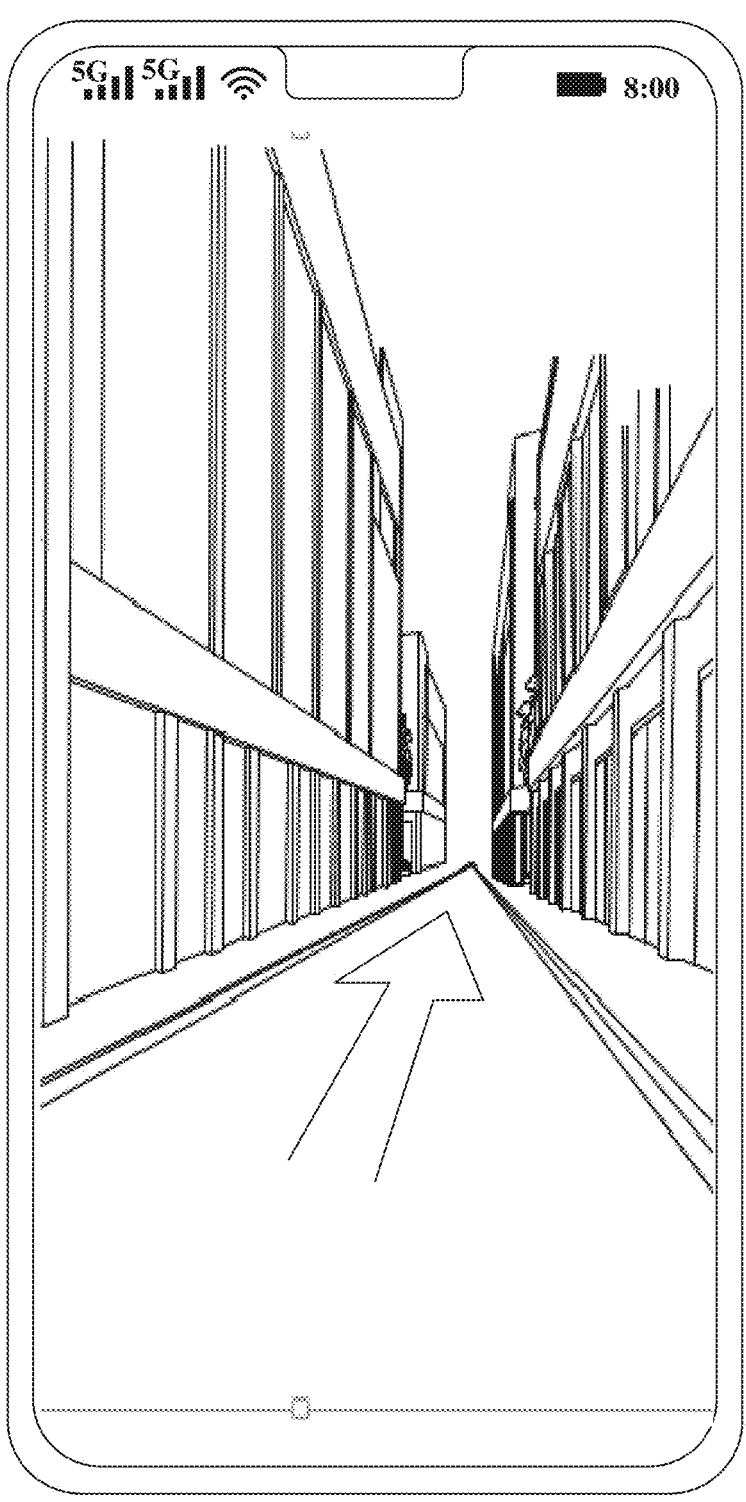
FIG. 4*b* is an example schematic diagram of a terminal interface according to an embodiment of this application.
Figure 5:
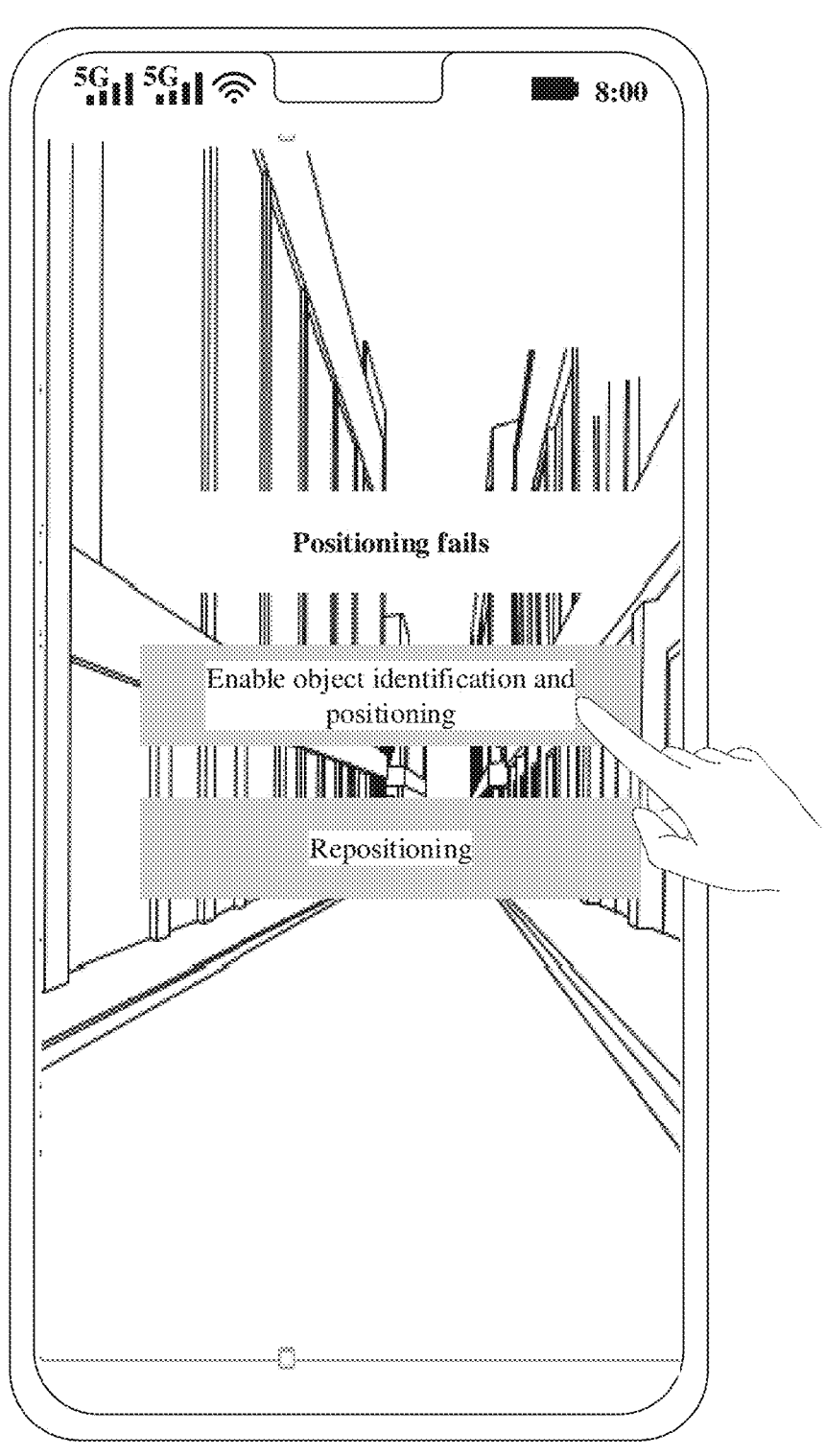
FIG. 5 is an example schematic diagram of a terminal interface according to an embodiment of this application.

Specifically, refer to FIG. 4a. FIG. 4a is a schematic diagram of a terminal interface according to an embodiment of this application. A terminal device may display an application navigation interface. The interface shown in FIG. 4a includes an AR navigation application. A user may start the AR navigation application, and then the terminal may display an interface shown in FIG. 4b. FIG. 4b is a schematic diagram of a terminal interface according to an embodiment of this application. As shown in FIG. 4b, the AR navigation interface may include a preview stream captured by the terminal device and a navigation identifier. The navigation identifier is generated based on corresponding real-time pose information obtained when the terminal device captures the preview stream. If pose precision of the real-time pose information is lower than a threshold, the terminal device may display a terminal interface shown in FIG. 5. FIG. 5 may include an identifier for indicating a current positioning failure, and a control (for example, a control of enabling object identification and positioning shown in FIG. 5) for indicating to start determining pose information based on the target object, and may further include a repositioning control.

As shown in FIG. 5, the user may tap the control of enabling object identification and positioning. In response to the operation of tapping the control of enabling object identification and positioning by the user, the terminal device may display a terminal interface shown in FIG. 6. The terminal interface may include prompt information for indicating the user to photograph the target object, for example, a name ("A", "B", "C", and "D" shown in FIG. 6) of the target object and a location (a "location 1", a "location 2", a "location 3", and a "location 4" shown in FIG. 6) of the target object shown in FIG. 6.

Figure 6:
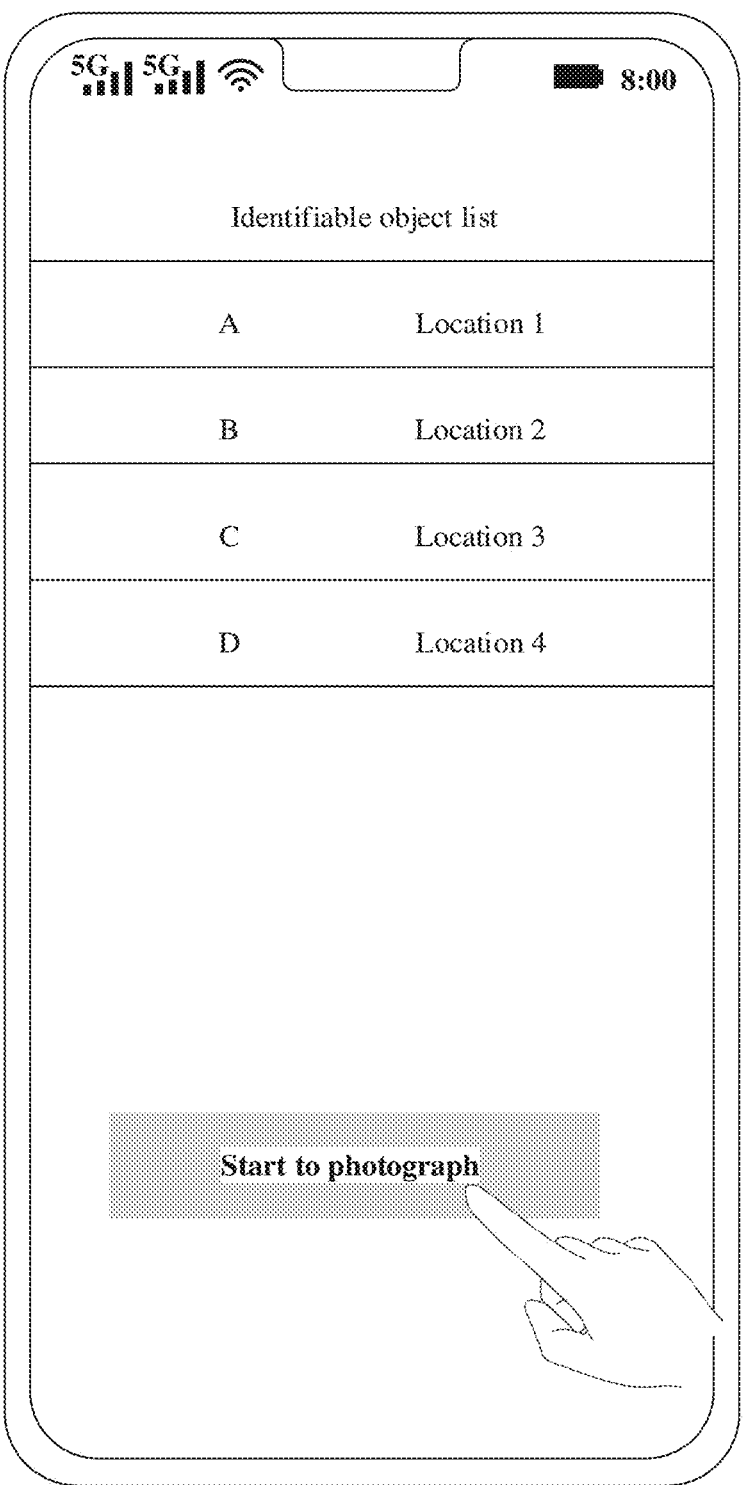
FIG. 6 is an example schematic diagram of a terminal interface according to an embodiment of this application.
Figure 7:
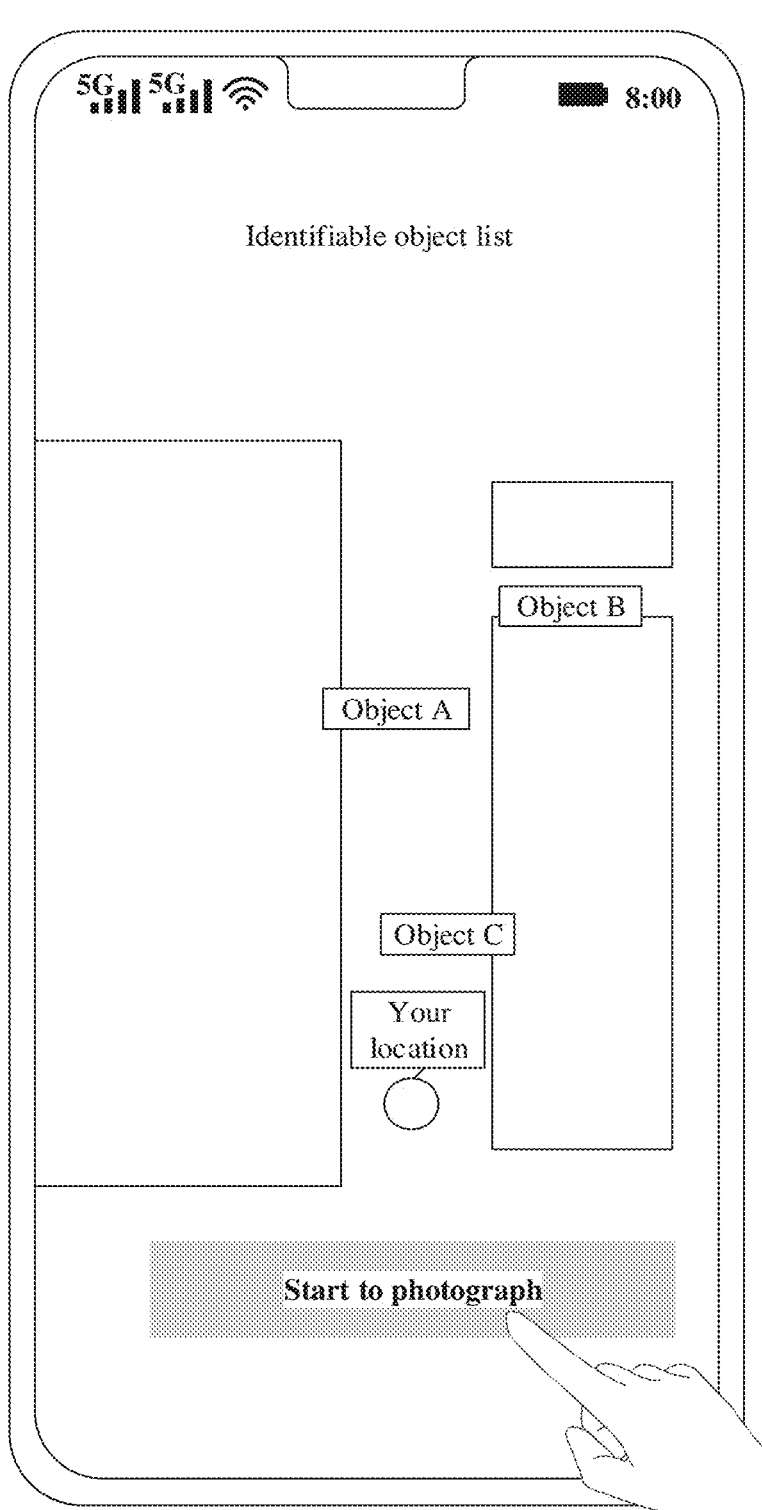
FIG. 7 is an example schematic diagram of a terminal interface according to an embodiment of this application.

In addition, in response to the operation of tapping the control of enabling object identification and positioning by the user, the terminal device may display a terminal interface shown in FIG. 7. The terminal interface may include the information about the target object (for example, the navigation information from the location of the terminal to the location of the target object), for example, a navigation interface shown in FIG. 6. The navigation interface may be a plane map, including an indication of the location of the terminal device and an indication of a location of the target object on the plane map.

It should be understood that interface layouts and control types in the terminal interfaces shown in FIG. 4b to FIG. 7 are merely examples, and do not constitute a limitation on this embodiment.

In this embodiment of this application, the terminal may obtain a target image captured by the user based on the prompt information, where the target image includes the target object.

In this embodiment of this application, the user may find the location of the target object based on the prompt.

For example, in a museum scenario, the terminal device may display a name, an image, or location information of at least one exhibit, and the user may select one exhibit (the target object), and find the location of the target object based on the name, the image, or the location information.

Further, the user may photograph the target object to obtain the target image, or the user may capture the target image to obtain the video stream, where the target image is an image frame in the video stream.

The following describes how the terminal photographs the target object to obtain the target image.

As shown in FIG. 6, when the user reaches a location near the target object, the user may tap a "start to photograph" control displayed on a terminal interface in FIG. 6. In response to the tapping of the "start to photograph" control by the user, the terminal device may display a photographing interface shown in FIG. 8a or FIG. 8b. As shown in FIG. 7, when the user reaches a location near the target object, the user may tap a "start to photograph" control displayed on a terminal interface in FIG. 7. In response to the tapping of the "start to photograph" control by the user, the terminal device may display a photographing interface shown in FIG. 8a or FIG. 8b.

In an implementation, after obtaining the target image, the terminal device may send the target image to the server, so that the server calculates the pose information of the terminal device based on the target image.

In an implementation, after obtaining the video stream including the target image, the terminal device may send the video stream to the server, so that the server calculates the pose information of the terminal device based on the target image in the video stream.

In an implementation, after obtaining the target image, the terminal device may calculate the pose information of the terminal device based on the target image.

In an implementation, after obtaining the video stream including the target image, the terminal device may calculate the pose information of the terminal device based on the target image in the video stream.

Figure 8A:
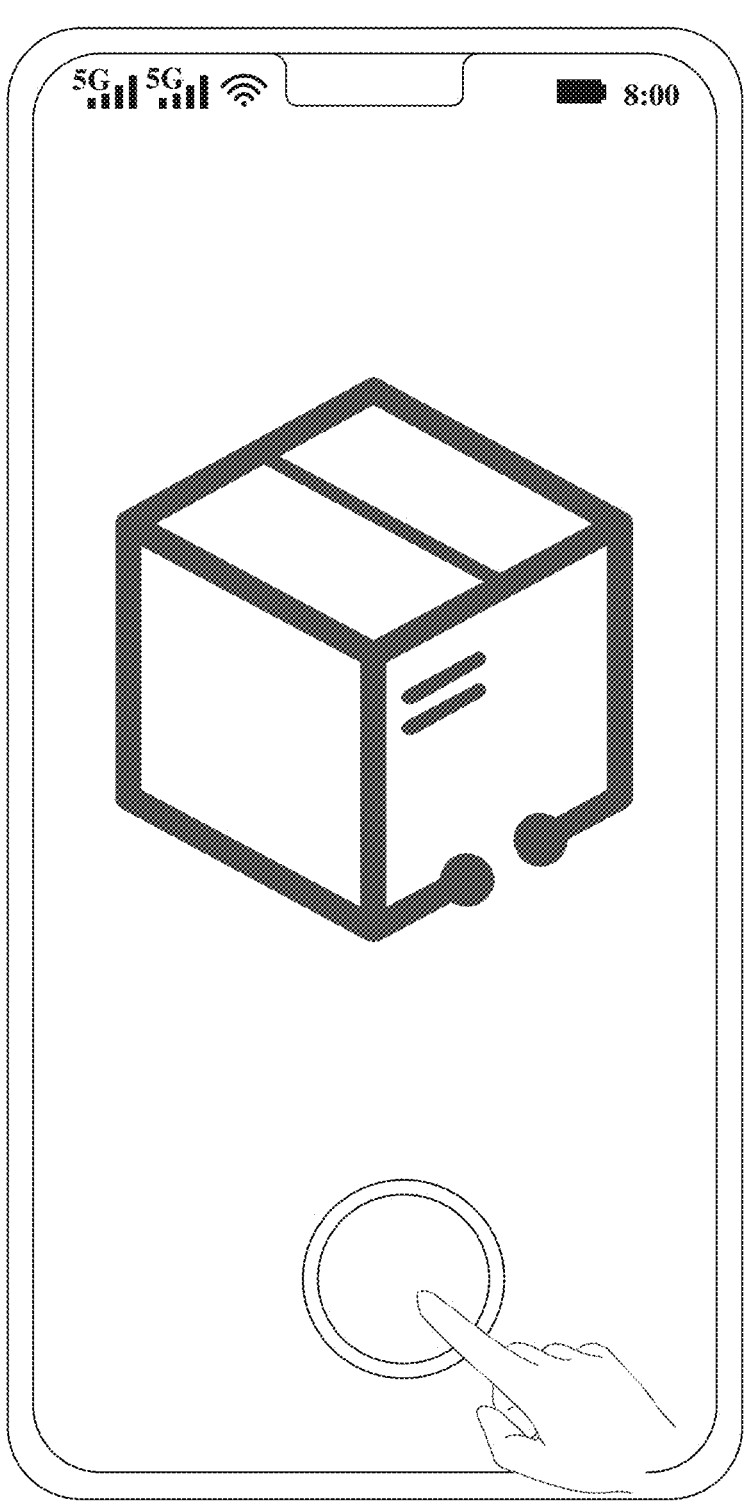
FIG. 8*a* is an example schematic diagram of a terminal interface according to an embodiment of this application.

As shown in FIG. 8a, FIG. 8a is a schematic diagram of an interface that is displayed by a terminal device and that is used for photographing a target object. The user may photograph the target object by using the photographing interface shown in FIG. 8a, to obtain a target image including the target object.

Figure 8B:
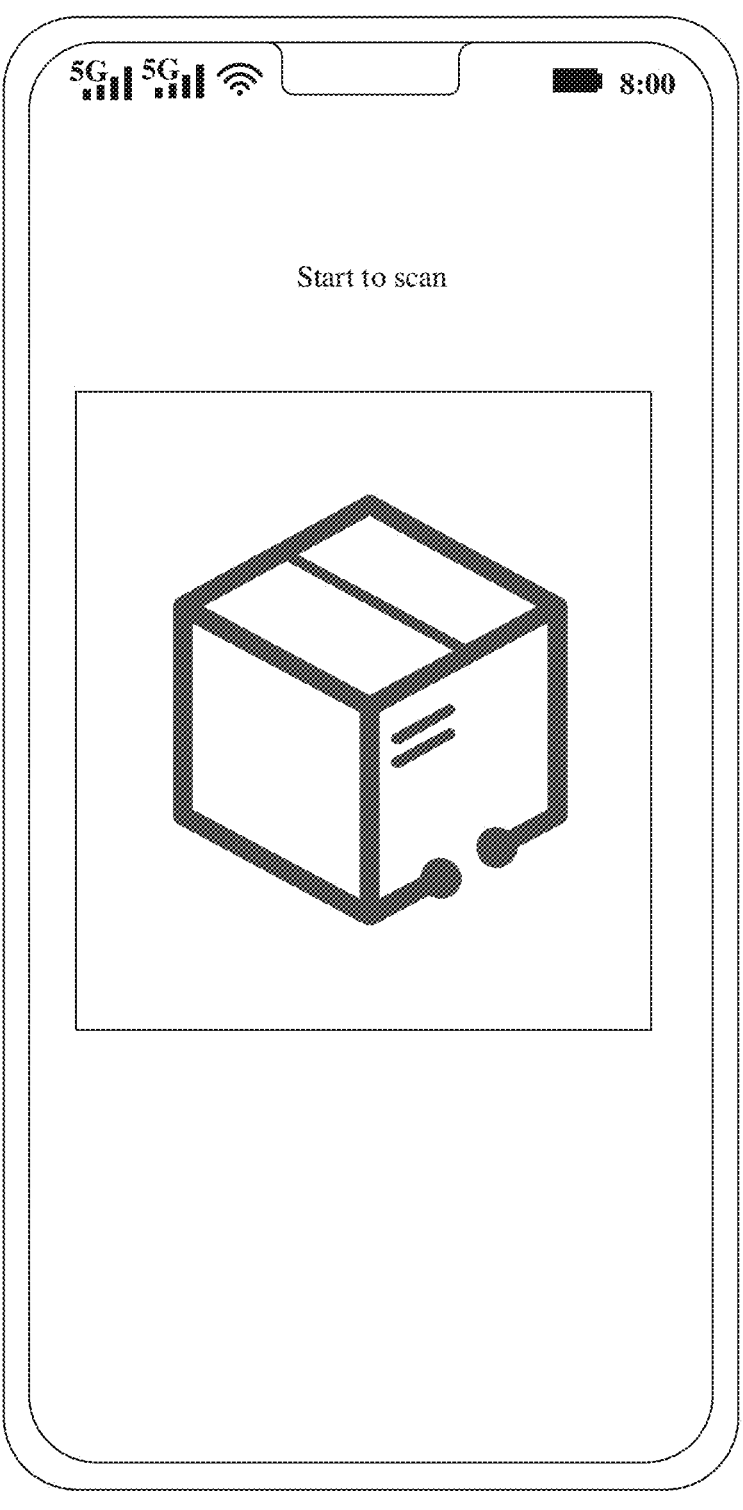
FIG. 8*b* is an example schematic diagram of a terminal interface according to an embodiment of this application.

As shown in FIG. 8b, FIG. 8b is a schematic diagram of an interface that is displayed by a terminal device and that is used for photographing a target object. The user may scan the target object by using the photographing interface shown in FIG. 8b, to obtain a video stream including the target object.

In this embodiment of this application, after the target image captured by the user based on the prompt information is obtained, the second pose information may be obtained based on the target object in the target image.

In this embodiment of this application, first pixel location of the target object in the target image and first location information corresponding to the target object in the digital map may be obtained, where the first location information indicates a location of the target object in the digital map;

and the second pose information is determined based on the first pixel location and the first location information.

In this embodiment of this application, the terminal device may obtain the first pixel location of the target object in the target image.

In an implementation, the determining of the first pixel location may be independently completed by the terminal device, or may be implemented by interaction between the terminal device and the server. To be specific, the server determines the first pixel location, and sends the first pixel location to the terminal device.

In this embodiment of this application, the terminal device may obtain the first location information corresponding to the target object in the digital map.

In an implementation, the determining of the first location information may be independently completed by the terminal device, or may be implemented by interaction between the terminal device and the server. To be specific, the server determines the first location information, and sends the first location information to the terminal device.

In this embodiment of this application, the terminal device may obtain the second pose information.

In an implementation, the step of determining the second pose information based on the first pixel location and the first location information may be independently completed by the terminal device, or may be implemented by interaction between the terminal device and the server. To be specific, the server determines the second pose information, and sends the second pose information to the terminal device.

In this embodiment of this application, the terminal device may send the target image to the server, and receive the second pose information sent by the server. The pose information is determined by the server based on the first pixel location of the target object in the target image and the first location information corresponding to the target object in the digital map. The first location information indicates the location of the target object in the digital map.

The second pose information is determined based on the 2D-3D correspondence between the first pixel location and the first location information. The 2D-3D correspondence indicates the correspondence between two-dimensional coordinates of the target object in the target image and three-dimensional coordinates of the target object in actual space.

In this embodiment of this application, the terminal device may obtain the first pixel location of the target object in the target image, send the first pixel location in the target image to the server, and receive the second pose information sent by the server. The pose information is determined by the server based on the first pixel location of the target object in the target image and the first location information corresponding to the target object in the digital map. The first location information indicates the location of the target object in the digital map.

In this embodiment of this application, the terminal device may obtain the first location information corresponding to the target object in the digital map, where the first location information indicates the location of the target object in the digital map; and send the target image and the first location information to the server, and receive the second pose information sent by the server, where the pose information is determined by the server based on the first pixel location of the target object in the target image and the first location information corresponding to the target object in the digital map, and the first location information indicates the location of the target object in the digital map.

In this embodiment of this application, the target object is the landmark object that is capable of being completely photographed under the current photographing parameter of the terminal and whose physical location is relatively fixed. A texture feature of the target object has a higher recognition degree than a texture feature of the first object. Therefore, the second pose information determined based on the target object does not meet the pose anomaly condition. For example, the second pose information is successfully solved, and a difference between the second pose information and the correct pose information is less than a threshold.

Figure 9A:
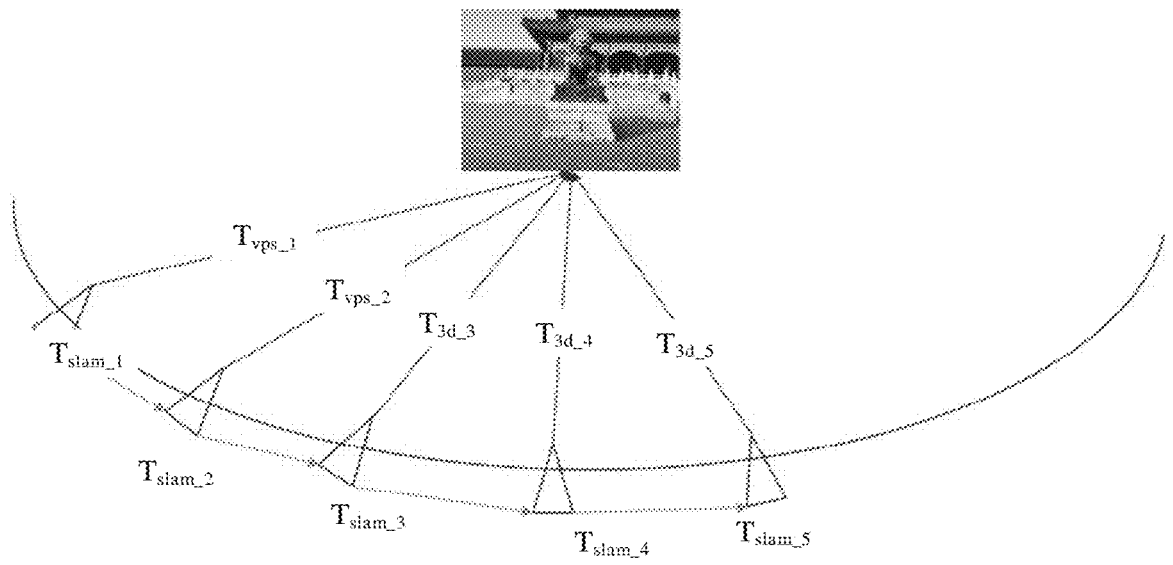
FIG. 9*a* is an example schematic diagram of a pose determining method according to an embodiment of this application.
Figure 9B:
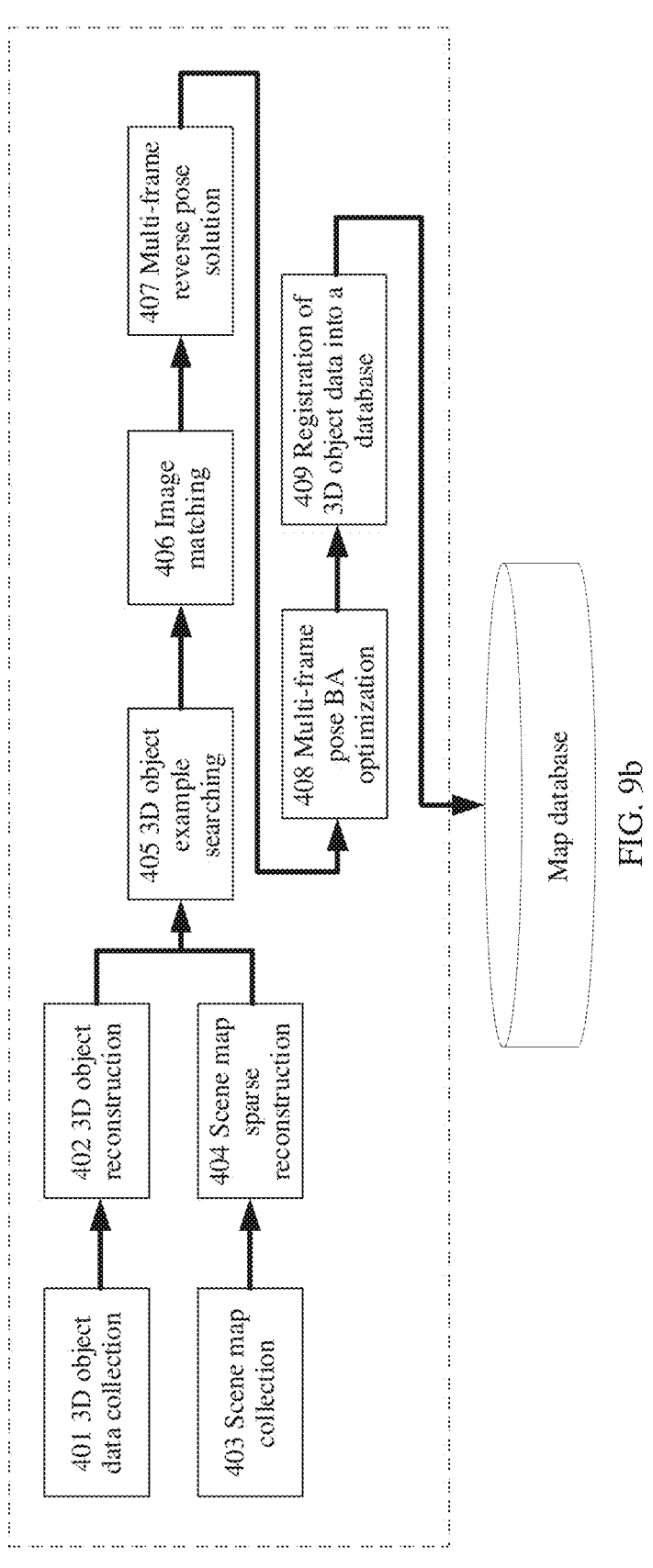
FIG. 9*b* is an example schematic diagram of offline data collection according to an embodiment of this application.

The following describes how to construct the digital map in this embodiment. As shown in FIG. 9b, a video frame sequence of the target object may be collected in advance. For example, the video frame sequence of the target object may be collected in a 360-degree surrounding manner, the video frame sequence is processed, 3D object modeling is performed offline, and a plurality of images of the target object, a local pose and a global pose of each image, and 3D point cloud data are output. The video frame sequence may be collected for a scene in which positioning is needed, the video frame sequence of the scene is processed, sparse reconstruction of the scene is completed offline, and a scene image database is output. The scene image database may include image data, a global pose, and a point cloud of the scene. Then, in the scene image database, an image including the target object is searched for, and a plurality of associated images of a scene map is output. In addition, features are extracted from the plurality of associated images. Image matching is performed on the features and the local poses of the target object. A 2D-2D correspondence between the features of the plurality of associated images and image features of the target object may be output. A relative relationship between the plurality of associated images and poses of the target object may be solved according to the pose solution algorithm based on a 2D-3D correspondence between the plurality of associated images and a 3D point cloud of the target object. The global poses of the target object may be calculated in combination with global poses of associated frames. The digital map may include the calculated data and global poses of the target object.

In addition, the global pose may be further optimized according to a graph optimization algorithm, to obtain a more robust global pose of the target object. Specifically, as shown in FIG. 9a, poses of three frames P1, P2, and P3 are obtained through calculation for the plurality of associated images. A connection line between each feature point X1 to X6 on the target object and an optical center of a camera intersects with the image. There is a difference between the intersection point and a projection (namely, a pixel on the image) of a real object point on an image plane. The difference cannot be exactly 0. In this case, the difference needs to be minimized to obtain an optimal camera pose. Solution of this optimal problem is referred to as BA optimization. Based on this, calculation may be performed based on sparseness of a BA model according to a Levenbrg-Marquardt (LM) algorithm. The LM algorithm is a combination of a steepest descent method (a gradient descent method) and Gauss-Newton.

Conventional pose solution is to solve a 3D object pose based on a 2D-3D relationship between 2D features of a 3D object image and a 3D point cloud of a scene. However, in a process of collecting and sparsely reconstructing a scene map, visual features in a large-scale environment are extracted, and sparse features and sparse point clouds are extracted for a 3D object in the scene. When the sparse point clouds are used for image matching and pose solution of the 3D object, accuracy and a success rate are not optimal neither. In this embodiment, reverse pose solution is to perform matching and pose solution by using an image scene and a dense 3D object point cloud. In this way, positioning accuracy and a success rate are greatly improved.

The following describes how to obtain the first pixel location of the target object in the target image and the first location information corresponding to the target object in the digital map.

In this embodiment of this application, the first pixel location may be a pixel location of a feature point or a feature line of the target object in the target image. The feature point may be a corner point of the target object in the target image. The feature line may be an edge line of the target object in the target image. This is not limited in this embodiment.

In this embodiment of this application, the first location information may include three-dimensional 3D object point cloud information of the target object in the digital map. The first location information may further include a corresponding global pose in which the photographing device photographs the target object to obtain the first image. Correspondingly, the second pose information finally obtained through calculation may indicate a corresponding global pose in which the terminal captures the target image.

In this embodiment of this application, the 2D-3D correspondence between the first pixel location and the first location information may be obtained. The 2D-3D correspondence indicates the correspondence between two-dimensional coordinates of the target object in the target image and three-dimensional coordinates of the target object in actual space. The second pose information is determined based on the 2D-3D correspondence.

Specifically, after the 2D-3D correspondence between the first pixel location and the first location information is obtained, the second pose information may be calculated according to the pose solution algorithm. The pose solution algorithm may include but is not limited to a pose solution algorithm for perspective of n points (pnp), a pose solution algorithm for perspective of two points (p2p), and the like.

Figure 9C:
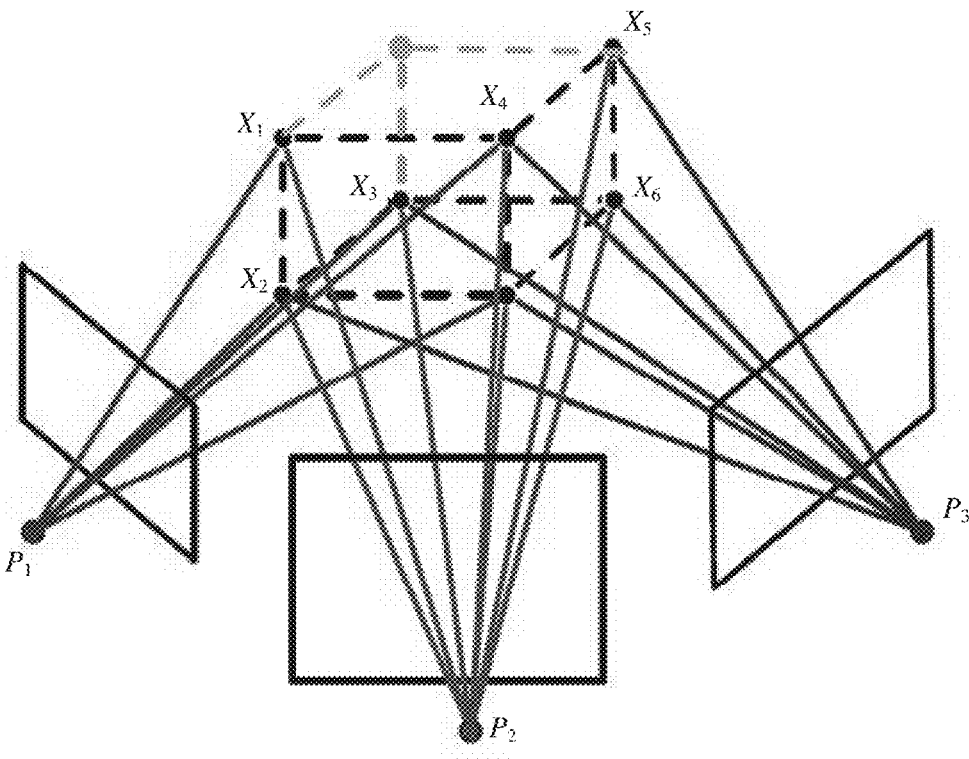
FIG. 9*c* is an example schematic diagram of a pose determining method according to an embodiment of this application.

In an implementation, after the target image is obtained, object identification may be first performed on the target image. Specifically, the target object in the target image may be identified by using a deep learning-based neural network model, and preliminary pose information of the terminal device that photographs the target object is output. Then, a local visual feature (the first pixel location) in the target image is extracted, 2D-2D matching is performed between the local visual feature and the image of the target object in the digital map. After that, a 2D-3D correspondence may be obtained in combination with the 3D object point cloud (the first location information) in the digital map. The 2D-3D correspondence is input to the pose solution algorithm to perform pose solution. Finally, a more accurate 3D object pose (the second pose information) is obtained. For a schematic diagram of 2D-3D matching, refer to FIG. 9c. A 3D point cloud of the point P1 in the digital map is X1-X4. This is similar for P2 and P3.

In this embodiment of this application, the second pose information may include a yaw angle, a pitch angle, and a roll angle at which the terminal device captures the target image.

It should be understood that after the second pose information is obtained, pose optimization may be further performed based on the second pose information, and a historical moment SLAM pose and a positioning pose result of the terminal device, to output optimized second pose information.

Specifically, as shown in FIG. 9a, the terminal device performs positioning while moving relative to the target object (a lion statue shown in FIG. 9a). At a moment T1, a global visual positioning pose is Tvps_1, and a local SLAM positioning pose is Tslam_1. At a moment T2, a global visual positioning pose is Tvps_2, and a local SLAM positioning pose is Tslam_2. At a moment T3, obtained second pose information is T3d_3, and a local SLAM positioning pose is Tslam_3. At a moment T4, obtained second pose information is T3d_4, and a local SLAM positioning pose is Tslam_4. At a moment T5, obtained second pose information is Tvps_5, and a local SLAM positioning pose is Tslam_5.

A result of the obtained second pose information is a global pose. There is such a constraint relationship between these poses: A transformation matrix between global poses at any two moments should be equal to a transformation matrix between local SLAM poses at corresponding moments. Under this constraint condition, a difference between the two transformation matrices is minimized through image optimization, and optimized second pose information at the moment T5 is output.

Figure 10:
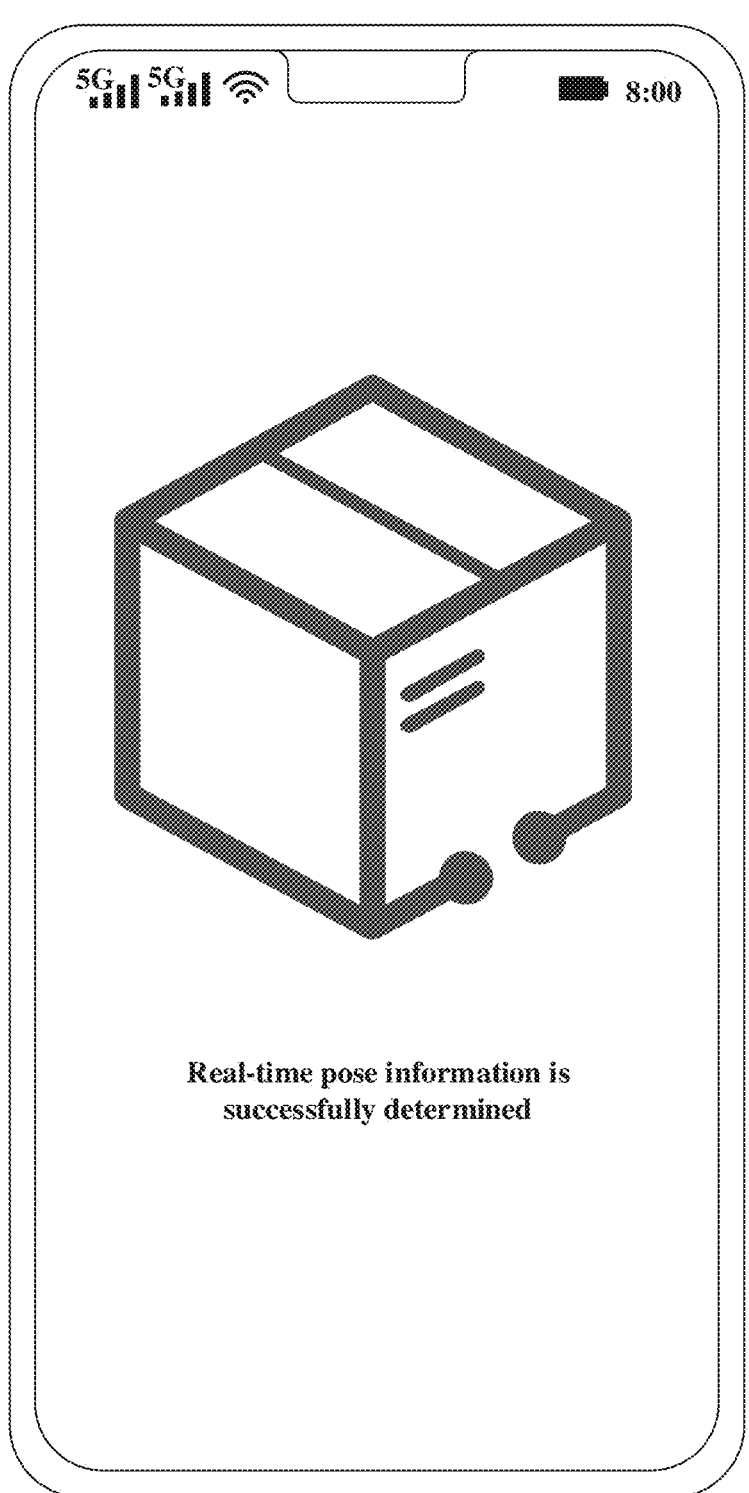
FIG. 10 is an example schematic diagram of a terminal interface according to an embodiment of this application.

In this embodiment of this application, after the terminal device obtains the second pose information, or the server obtains the second pose information and sends the second pose information to the terminal device, the terminal device may display a terminal interface shown in FIG. 10. The terminal interface indicates that positioning succeeds, and the terminal device may return to the AR interface (for example, an AR navigation interface shown in FIG. 11).

In this embodiment of this application, after the terminal device obtains the second pose information, or the server obtains the second pose information and sends the second pose information to the terminal device, the terminal device may further obtain a pose change of the terminal device, and determine a real-time pose based on the second pose information and the obtained pose change of the terminal device.

In this embodiment of this application, the terminal device may use the obtained second pose information as an initial pose, determine the pose change of the terminal device by using a simultaneous localization and mapping (SLAM) tracking technology, and determine the real-time pose based on the initial pose and the pose change of the terminal. The terminal device may perform processing such as navigation, route planning, and obstacle avoidance based on the real-time pose. For example, during route planning, the terminal device performs route planning based on a coordinate position to obtain a planned route, where a start point or an end point of the planned route is the coordinate position; and displays a two-dimensional navigation interface, where the two-dimensional navigation interface includes the planned route; or displays the AR navigation interface, where the AR navigation interface includes an image of an environment in which the terminal device is currently located and a navigation guide, and the navigation guide is determined based on the yaw angle, the pitch angle, and the roll angle of the terminal device.

Optionally, in addition to performing processing such as navigation, route planning, and obstacle avoidance based on the real-time pose, after obtaining the second pose information, the terminal device may further obtain a preview stream of a current scenario; determine, based on the second pose information, preset media content included in the digital map corresponding to a scenario in the preview stream; and render the media content in the preview stream.

Figure 11:
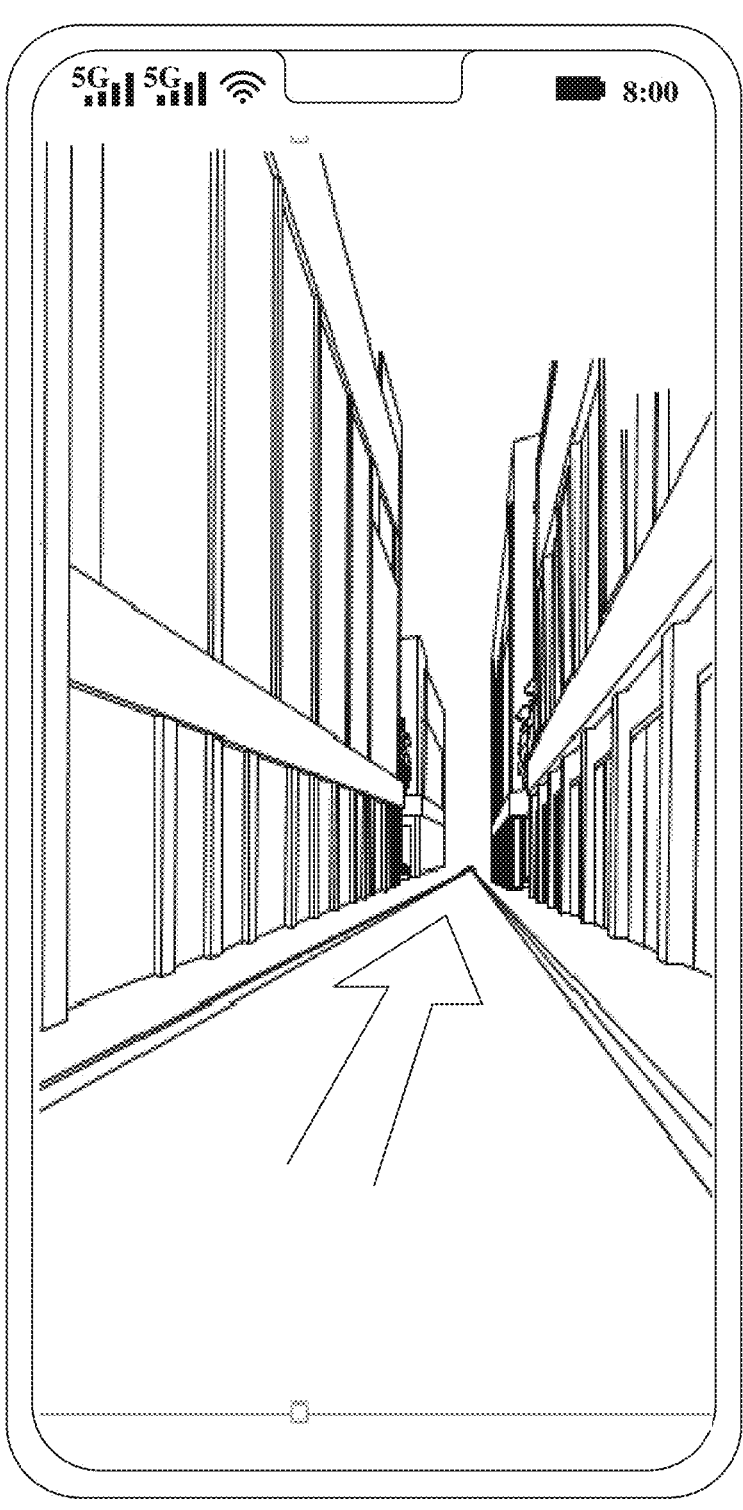
FIG. 11 is an example schematic diagram of a terminal interface according to an embodiment of this application.

FIG. 10 shows an interface displayed after the terminal obtains the second pose information. As shown in FIG. 10, if the second pose information does not meet the pose anomaly condition, it is equivalent that a difference between the second pose information and a correct value of the pose is less than a threshold. In other words, the second pose information may correctly represent a current pose of the terminal. Then, as shown in FIG. 11, the AR navigation interface of the AR navigation application may continue to be displayed starting from the current pose of the terminal.

In this implementation of this application, if the terminal device is a mobile phone, an AR wearable device, or the like, a virtual scenario may be constructed based on the pose information. First, the terminal device may obtain the preview stream of the current scenario. For example, the user may capture a preview stream of a current environment in a shopping mall. Then, the terminal device may determine the second pose information as the initial pose by using the method mentioned above. Then, the terminal device may obtain the digital map. The digital map records three-dimensional coordinates of each position in the world coordinate system. Corresponding preset media content exists in a preset three-dimensional coordinate position. The terminal may determine, in the digital map, target three-dimensional coordinates corresponding to the real-time pose. If the corresponding preset media content exists at the target three-dimensional coordinates, the terminal obtains the preset media content. For example, the user photographs a target store, and the terminal identifies a real-time pose, determines that a current camera is photographing a target store, and may obtain preset media content corresponding to the target store. The preset media content corresponding to the target store may be description information of the target store, for example, which commodities in the target store are commodities that are worth purchasing. Based on this, the terminal may render the media content in the preview stream. In this case, the user may view the preset media content corresponding to the target store in a preset area near the image corresponding to the target store in the mobile phone. After viewing the preset media content corresponding to the target store, the user may have a general understanding of the target store.

Different digital maps may be set for different places. In this way, when the user moves to another place, preset media content corresponding to a real-time pose may also be obtained based on a media content rendering manner provided in this embodiment of this disclosure, and the media content is rendered in the preview stream.

An embodiment of this application provides a pose determining method. The method includes: obtaining a first image; determining first pose information based on the first image, where the first pose information indicates a corresponding pose in which a terminal captures the first image; and when the first pose information meets a pose anomaly condition, displaying prompt information for indicating to photograph a target object, where the target object is around a location of the terminal, the target object is not in the first image, the target object is used to obtain second pose information, the second pose information indicates a corresponding pose in which the terminal photographs the target object, and the second pose information does not meet the pose anomaly condition. In this manner, when high-precision pose information cannot be determined, pose positioning is implemented by using the target object in a scenario, so that the high-precision pose information is determined based on valid information in the scenario. In addition, in a process of determining pose information of a terminal device, prompt information for indicating the user to photograph the target object is displayed, and the user is indicated to photograph the target object, thereby avoiding that the user does not know how to operate or scan an invalid target object.

Refer to FIG. 12. FIG. 12 is a schematic diagram of an embodiment of a pose determining method according to an embodiment of this application. As shown in FIG. 12, the pose determining method provided in this application includes the following steps.

1201: A server obtains first pose information, where the first pose information is determined based on a first image, and the first pose information indicates a corresponding pose in which a terminal captures the first image.

For a specific description of step 1201, refer to the description that the server obtains the first pose information in step 301 and step 302.

1202: Obtain a location of the terminal.

For a specific description of step 1202, refer to the description that the server obtains location information of the terminal in step 302.

1203: When the first pose information meets a pose anomaly condition, determine a target object based on the location of the terminal, where the target object is around the location of the terminal, and the target object is not in the first image.

For a specific description of step 1203, refer to the description of obtaining information about the target object in step 303.

1204: Send information about the target object to the terminal, where the target object is used to obtain second pose information, the second pose information indicates a corresponding pose in which the terminal photographs the target object, and the second pose information does not meet the pose anomaly condition.

For a specific description of step 1204, refer to the description of sending the information about the target object to the terminal in step 303.

In a possible implementation, the server may further obtain a target image sent by the terminal, where the target image includes the target object; and obtain the second pose information based on the target image, and send the second pose information to the terminal.

In a possible implementation, the information about the target object includes at least one of the following information: a location of the target object, and an image, a name, and a category of the target object.

In a possible implementation, the target object is a landmark object that is capable of being completely photographed under a current photographing parameter of the terminal and whose physical location is relatively fixed.

In a possible implementation, the first image includes a first object, the first object is used to determine the first pose information, and a texture feature of the target object has a higher recognition degree than a texture feature of the first object.

In a possible implementation, the first pose information is determined based on first 3D point cloud information corresponding to the first object in a digital map; or the second pose information is determined based on corresponding second 3D point cloud information of the target object in the digital map, and a point cloud density of the second 3D point cloud information is higher than a point cloud density of the first 3D point cloud information.

In a possible implementation, the pose anomaly condition includes:

pose information is unavailable; or a deviation between currently determined pose information and correct pose information is greater than a threshold.

In a possible implementation, the determining a target object based on the location of the terminal includes:

determining the target object from a digital map based on the location of the terminal, where the digital map includes a plurality of objects, and the target object is an object around the location of the terminal in the plurality of objects.

In a possible implementation, the server may further obtain first pixel location of the target object in the target image and first location information corresponding to the target object in the digital map, where the first location information indicates a location of the target object in the digital map; and determine the second pose information based on the first pixel location and the first location information.

In a possible implementation, the server may further receive the first pixel location that is of the target object in the target image and that is sent by the terminal.

In a possible implementation, the server may further receive the target image sent by the terminal; and determine, based on the target image, the first location information corresponding to the target object in the digital map.

In a possible implementation, the server may further receive the first location information that corresponds to the target object in the digital map and that is sent by the terminal.

In a possible implementation, the server may further obtain a 2D-3D correspondence between the first pixel location and the first location information, where the 2D-3D correspondence indicates a correspondence between two-dimensional coordinates of the target object in the target image and three-dimensional coordinates of the target object in actual space; and determine the second pose information based on the 2D-3D correspondence.

In a possible implementation, the first location information includes a global pose in which a photographing device photographs the target object in advance, and correspondingly, the second pose information indicates a corresponding global pose in which the terminal captures the target image.

An embodiment of this application provides a pose determining method. The method includes: obtaining first pose information, where the first pose information is determined based on a first image, and the first pose information indicates a corresponding pose in which a terminal captures the first image; obtaining a location of the terminal; when the first pose information meets a pose anomaly condition, determining a target object based on the location of the terminal, where the target object is around the location of the terminal, and the target object is not in the first image; and sending information about the target object to the terminal, where the target object is used to obtain second pose information, the second pose information indicates a corresponding pose in which the terminal photographs the target object, and the second pose information does not meet the pose anomaly condition. In this manner, when high-precision pose information cannot be determined, pose positioning is performed by using the target object in a scenario, and the pose information is determined based on valid information in the scenario.

This application further provides a pose determining apparatus. The pose determining apparatus may be a terminal device. Refer to FIG. 13. FIG. 13 is a schematic diagram of a structure of a pose determining apparatus according to an embodiment of this application. As shown in FIG. 13, the pose determining apparatus 1300 includes:

an obtaining module 1301, configured to obtain a first image, where for a specific description of the obtaining module 1301, refer to the description in the embodiment corresponding to step 301;

a pose determining module 1302, configured to determine first pose information based on the first image, where the first pose information indicates a corresponding pose in which a terminal captures the first image; and for a specific description of the pose determining module 1302, refer to the description in the embodiment corresponding to step 302; and a display module 1303, configured to: when the first pose information meets a pose anomaly condition, display prompt information for indicating to photograph a target object, where the target object is around a location of the terminal, the target object is not in the first image, the target object is used to obtain second pose information, the second pose information indicates a corresponding pose in which the terminal photographs the target object, and the second pose information does not meet the pose anomaly condition; and for a specific description of the display module 1303, refer to the description in the embodiment corresponding to step 304.

In a possible implementation, the obtaining module 1301 is configured to obtain a target image captured by a user based on the prompt information, where the target image includes the target object; and obtain the second pose information based on the target image.

In a possible implementation, that the target object is around a location of the terminal includes: the target object and the location of the terminal are within a preset distance range, the target object and the location of the terminal are in a same region of a map, and there is no other obstacle between the target object and the location of the terminal.

In a possible implementation, the obtaining module 1301 is configured to:

obtain a location of the terminal.

The apparatus further includes:

a sending module, configured to send the location of the terminal to a server; and a receiving module, configured to receive information that is about the target object and that is sent by the server, where the target object is determined by the server based on the location of the terminal.

In a possible implementation, the obtaining module 1301 is configured to:

obtain a location of the terminal; and obtain the information about the target object from a digital map based on the location of the terminal, where the digital map includes a plurality of objects, and the target object is an object around the location of the terminal in the plurality of objects.

In a possible implementation, the information about the target object includes at least one of the following information: a location of the target object, and an image, a name, and a category of the target object. Correspondingly, the prompt information includes at least one of the following information: the location of the target object, navigation information from the location of the terminal to the location of the target object, and the image, the name, and the category of the target object.

In a possible implementation, the target object is a landmark object that is capable of being completely photographed under a current photographing parameter of the terminal and whose physical location is relatively fixed.

In a possible implementation, the first image includes a first object, the first object is used to determine the first pose information, and a texture feature of the target object has a higher recognition degree than a texture feature of the first object.

In a possible implementation, the sending module is configured to send the first pose information to the server; the obtaining module is configured to receive first information that is sent by the server and that indicates that the first pose information meets the pose anomaly condition; and the display module is configured to display, based on the first information, the prompt information for indicating to photograph the target object.

In a possible implementation, the pose anomaly condition includes:

pose information is unavailable; or a deviation between currently determined pose information and correct pose information is greater than a threshold.

Figure 14:
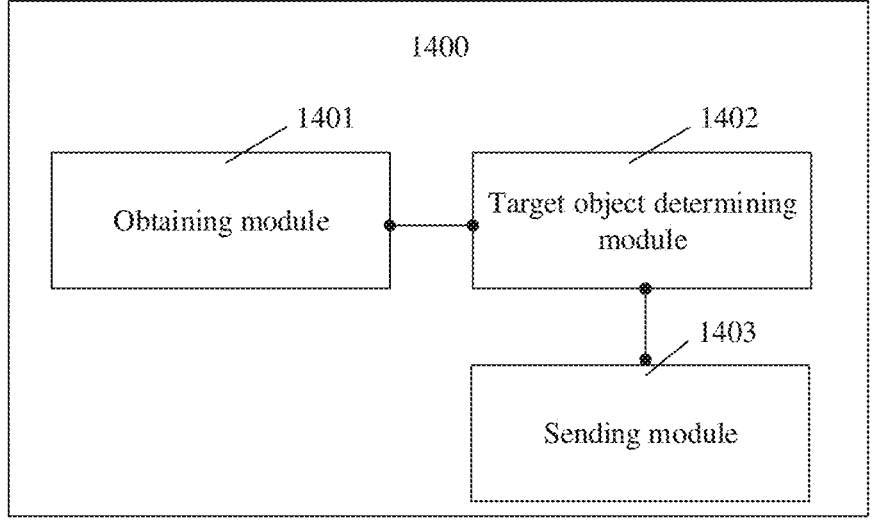
FIG. 14 is an example schematic diagram of a structure of a pose determining apparatus according to an embodiment of this application.

This application further provides a pose determining apparatus. The pose determining apparatus may be a server. Refer to FIG. 14. FIG. 14 is a schematic diagram of a structure of a pose determining apparatus according to an embodiment of this application. As shown in FIG. 14, the pose determining apparatus 1400 includes:

an obtaining module 1401, configured to obtain first pose information, where the first pose information is determined based on a first image, and the first pose information indicates a corresponding pose in which a terminal captures the first image; and obtain a location of the terminal, where for a specific description of the obtaining module 1401, refer to the description in the embodiments corresponding to step 1201 and step 1202;

a target object determining module 1402, configured to: when the first pose information meets a pose anomaly condition, determine a target object based on the location of the terminal, where the target object is around the location of the terminal, and the target object is not in the first image; and for a specific description of the target object determining module 1402, refer to the description in the embodiment corresponding to step 1203; and a sending module 1403, configured to: when the first pose information meets a pose anomaly condition, determine a target object based on the location of the terminal, where the target object is around the location of the terminal, and the target object is not in the first image; and for a specific description of the sending module 1403, refer to the description in the embodiment corresponding to step 1203.

In a possible implementation, the obtaining module 1401 is configured to:

obtain a target image sent by the terminal, where the target image includes the target object; and obtain the second pose information based on the target image, and send the second pose information to the terminal.

In a possible implementation, the information about the target object includes at least one of the following information: a location of the target object, and an image, a name, and a category of the target object.

In a possible implementation, the target object is a landmark object that is capable of being completely photographed under a current photographing parameter of the terminal and whose physical location is relatively fixed.

In a possible implementation, the first image includes a first object, the first object is used to determine the first pose information, and a texture feature of the target object has a higher recognition degree than a texture feature of the first object.

In a possible implementation, the first pose information is determined based on first 3D point cloud information corresponding to the first object in a digital map; or the second pose information is determined based on corresponding second 3D point cloud information of the target object in the digital map, and a point cloud density of the second 3D point cloud information is higher than a point cloud density of the first 3D point cloud information.

In a possible implementation, the pose anomaly condition includes:

pose information is unavailable; or a deviation between currently determined pose information and correct pose information is greater than a threshold. In a possible implementation, the target object determining module is configured to determine the target object from a digital map based on the location of the terminal, where the digital map includes a plurality of objects, and the target object is an object around the location of the terminal in the plurality of objects.

In a possible implementation, the obtaining module 1401 is configured to:

obtain a first pixel location of the target object in the target image;

obtain first location information corresponding to the target object in the digital map, where the first location information indicates a location of the target object in the digital map; and determine the second pose information based on the first pixel location and the first location information.

In a possible implementation, the obtaining module 1401 is specifically configured to:

receive the first pixel location that is of the target object in the target image and that is sent by the terminal.

In a possible implementation, the obtaining module 1401 is specifically configured to:

receive the target image sent by the terminal; and determine, based on the target image, the first location information corresponding to the target object in the digital map.

In a possible implementation, the obtaining module 1401 is specifically configured to:

receive the first location information that corresponds to the target object in the digital map and that is sent by the terminal.

In a possible implementation, the obtaining module is specifically configured to:

obtain a 2D-3D correspondence between the first pixel location and the first location information, where the 2D-3D correspondence indicates a correspondence between two-dimensional coordinates of the target object in the target image and three-dimensional coordinates of the target object in actual space; and determine the second pose information based on the 2D-3D correspondence.

In a possible implementation, the first location information includes a global pose in which a photographing device photographs the target object to obtain a first image, and correspondingly, the second pose information indicates a corresponding global pose in which the terminal captures the target image.

Figure 15:
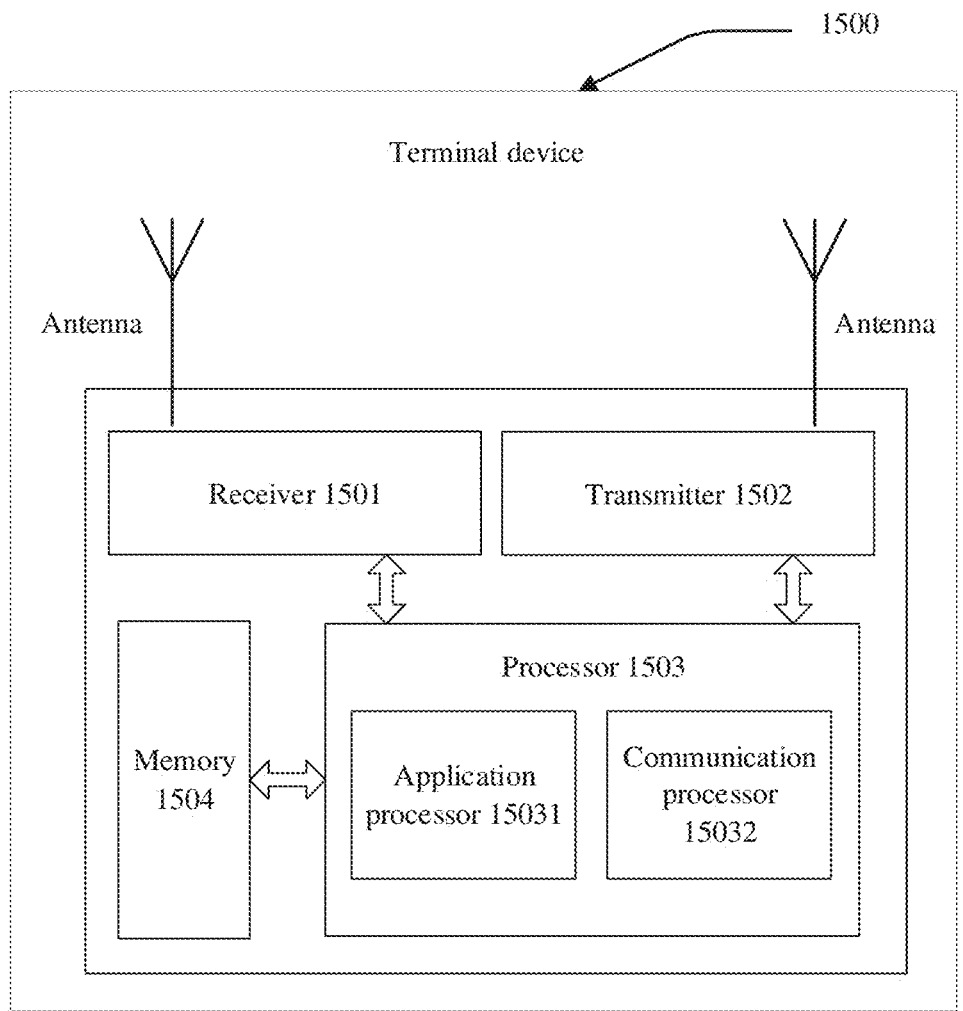
FIG. 15 is an example schematic diagram of a structure of a terminal device according to an embodiment of this application.

The following describes a terminal device provided in an embodiment of this application. The terminal device may be the pose determining apparatus in FIG. 13. Refer to FIG. 15. FIG. 15 is a schematic diagram of a structure of a terminal device according to an embodiment of this application. The terminal device 1500 may be specifically a virtual reality VR device, a mobile phone, a tablet computer, a notebook computer, an intelligent wearable device, or the like. This is not limited herein. Specifically, the terminal device 1500 includes a receiver 1501, a transmitter 1502, a processor 1503, and a memory 1504 (there may be one or more processors 1503 in the terminal device 1500, and one processor is used as an example in FIG. 15). The processor 1503 may include an application processor 15031 and a communication processor 15032. In some embodiments of this application, the receiver 1501, the transmitter 1502, the processor 1503, and the memory 1504 may be connected through a bus or in another manner.

The memory 1504 may include a read-only memory and a random access memory, and provide instructions and data for the processor 1503. A part of the memory 1504 may further include a non-volatile random access memory (NVRAM). The memory 1504 stores a processor and operation instructions, an executable module or a data structure, a subnet thereof, or an expanded set thereof. The operation instructions may include various operation instructions, to implement various operations.

The processor 1503 controls an operation of the terminal device. In a specific application, components of the terminal device are coupled together through a bus system. In addition to a data bus, the bus system may further include a power bus, a control bus, a status signal bus, and the like. However, for clear description, various types of buses in the figure are marked as the bus system.

The method disclosed in the foregoing embodiments of this application may be applied to the processor 1503, or may be implemented by the processor 1503. The processor 1503 may be an integrated circuit chip, and has a signal processing capability. In an implementation process, steps in the foregoing methods may be implemented by using a hardware integrated logical circuit in the processor 1503, or by using instructions in a form of software. The processor 1503 may be a general-purpose processor, a digital signal processor (DSP), a microprocessor, or a microcontroller. The processor 1503 may further include an application-specific integrated circuit (ASIC), a field-programmable gate array (FPGA) or another programmable logic device, a discrete gate, a transistor logic device, or a discrete hardware component. The processor 1503 may implement or perform the method, the steps, and the logical block diagrams disclosed in embodiments of this application. The general-purpose processor may be a microprocessor, or the processor may be any conventional processor or the like. Steps of the methods disclosed with reference to embodiments of this application may be directly executed and completed by a hardware decoding processor, or may be executed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory 1504, and the processor 1503 reads information in the memory 1504 and completes the steps in the foregoing methods in combination with hardware in the processor 1503. Specifically, the processor 1503 may read information in the memory 1504, and complete the data processing related steps in step 301 to step 303 in the foregoing embodiment in combination with hardware of the processor 1503.

The receiver 1501 may be configured to receive input digital or character information, and generate signal input related to a related setting and function control of the terminal device. The transmitter 1502 may be configured to output the digital or character information through a first interface. The transmitter 1502 may further be configured to send instructions to a disk group through the first interface, to modify data in the disk group. The transmitter 1502 may further include a display device such as a display.

Figure 16:
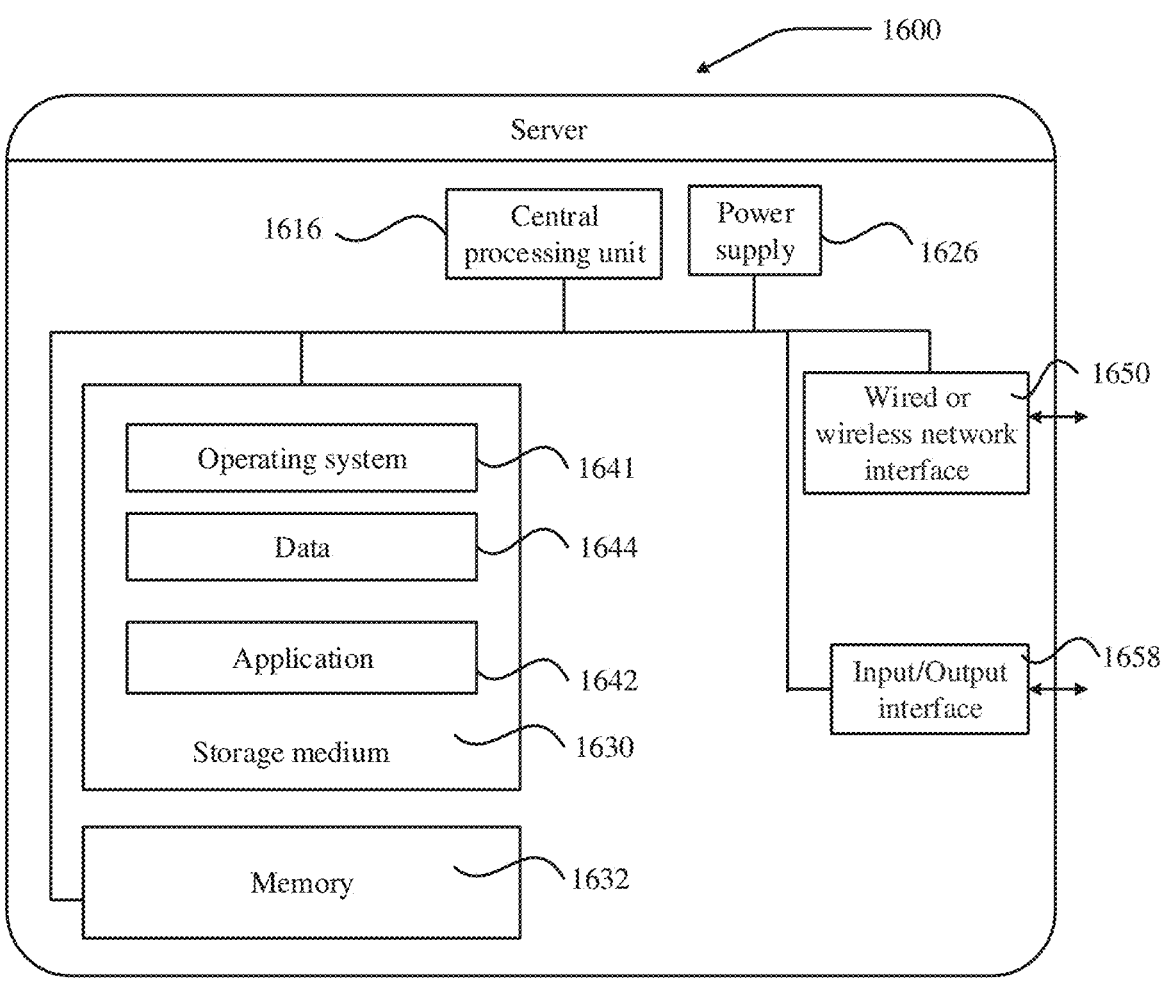
FIG. 16 is an example schematic diagram of a structure of a server according to an embodiment of this application.

An embodiment of this application further provides a server. The server may be the pose determining apparatus in FIG. 14. Refer to FIG. 16. FIG. 16 is a schematic diagram of a structure of a server according to an embodiment of this application. Specifically, the server 1600 may differ greatly due to different configurations or performance, and may include one or more central processing units (CPUs) 1616 (for example, one or more processors) and a memory 1632, one or more storage media 1630 (for example, one or more massive storage devices) that store an application program 1642 or data 1644. The memory 1632 and the storage medium 1630 may be transitory storage or persistent storage. A program stored in the storage medium 1630 may include one or more modules (not shown in the figure), and each module may include a series of instruction operations to be performed on a server. Still further, the central processing unit 1616 may be configured to communicate with the storage medium 1630, and perform, on the server 1600, the series of instruction operations in the storage medium 1630.

The server 1600 may further include one or more power supplies 1626, one or more wired or wireless network interfaces 1650, one or more input/output interfaces 1658, or one or more operating systems 1641, such as Windows Server™, Mac OS X™, Unix™, Linux™, and FreeBSD™.

Specifically, the central processing unit 1616 may complete the data processing related steps in step 1201 to step 1204 in the foregoing embodiment.

An embodiment of this application further provides a computer program product. When the computer program product is run on a computer, the computer is enabled to perform the steps in the pose determining method.

An embodiment of this application further provides a computer-readable storage medium. The computer-readable storage medium stores a program for signal processing. When the program is run on a computer, the computer is enabled to perform the steps in the pose determining method described in the foregoing embodiments.

In addition, it should be noted that the apparatus embodiments described above are merely an example. The units described as separate parts may or may not be physically separate, and parts displayed as units may or may not be physical units, may be located in one position, or may be distributed on a plurality of network units. Some or all the modules may be selected according to an actual need to achieve the objectives of the solutions of the embodiments. In addition, in the accompanying drawings of the apparatus embodiments provided by this application, connection relationships between modules indicate that the modules have communication connections with each other, which may be specifically implemented as one or more communication buses or signal cables.

Based on the description of the foregoing implementations, a person skilled in the art may clearly understand that this application may be implemented by software in addition to necessary universal hardware, or by dedicated hardware, including a dedicated integrated circuit, a dedicated CPU, a dedicated memory, a dedicated component, and the like. Usually, any function implemented by a computer program may be easily implemented by using corresponding hardware. In addition, specific hardware structures used to implement a same function may be various, for example, an analog circuit, a digital circuit, or a dedicated circuit. However, in this application, a software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, or a network device) to perform the methods described in embodiments of this application.

All or some of the foregoing embodiments may be implemented by software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device integrating one or more usable media, for example, a server or a data center. The usable medium may be a magnetic medium (for example, a floppy disk, a hard disk, or a magnetic tape), an optical medium (for example, a DVD), a semiconductor medium (for example, a solid state drive (SSD)), or the like.

What is claimed is:

1. A pose determining method, comprising:
obtaining a first image;
determining first pose information based on the first image, wherein the first pose information indicates a corresponding pose in which a terminal captures the first image; and
displaying prompt information, for indicating to photograph a target object, based on the first pose information satisfying a pose anomaly condition, wherein
the target object is around a location of the terminal,
the target object is not in the first image,
the target object is used to obtain second pose information,
the second pose information indicates a corresponding pose in which the terminal photographs the target object,
the second pose information does not satisfy the pose anomaly condition,
the first image includes a first object used to determine the first pose information, and
a texture feature of the target object has a higher recognition degree than a texture feature of the first object.

2. The method according to claim 1, further comprising:
obtaining a target image captured by a user based on the prompt information, wherein the target image includes the target object; and
obtaining the second pose information based on the target image.

3. The method according to claim 1, wherein the target object is around the location of the terminal comprises:
the target object and the location of the terminal are within a specified distance range,
the target object and the location of the terminal are in a same region of a map, and
no other obstacle exists between the target object and the location of the terminal.

4. The method according to claim 1, wherein before displaying the prompt information for indicating to photograph the target object, the method further comprises:
obtaining the location of the terminal;
sending the location of the terminal to a server; and
receiving information about the target object sent by the server, wherein the target object is determined by the server based on the location of the terminal.

5. The method according to claim 1, wherein before displaying the prompt information for indicating to photograph the target object, the method further comprises:
obtaining the location of the terminal; and
determining, from a digital map based on the location of the terminal, the target object satisfying a preset condition, wherein the digital map includes a plurality of objects, the plurality of objects are around the location of the terminal, and the preset condition includes at least one of:
at least one object in the plurality of objects that is closer to the location of the terminal;
at least one object randomly determined in the plurality of objects;
at least one object in the plurality of objects, wherein no other obstacle exists between the at least one object and the location of the terminal; or
at least one object in the plurality of objects to which the terminal needs to move from the location for a shorter distance.

6. The method according to claim 4, wherein the information about the target object comprises at least one of:
a location of the target object, and an image, a name, and a category of the target object, and
the prompt information includes at least one of:
the location of the target object,
navigation information from the location of the terminal to the location of the target object, and the image, the name, and the category of the target object.

7. The method according to claim 1, wherein the target object is a landmark object, capable of being completely photographed under a current photographing parameter of the terminal, whose physical location is relatively fixed.

8. The method according to claim 1, wherein displaying the prompt information for indicating to photograph the target object when the first pose information meets the pose anomaly condition further comprises:

sending the first pose information to the server;

receiving first information sent by the server that indicates that the first pose information meets the pose anomaly condition; and displaying, based on the first information, the prompt information for indicating to photograph the target object.

9. The method according to claim 1, wherein the pose anomaly condition comprises:

pose information is unavailable, or a deviation between currently determined pose information and correct pose information is greater than a threshold.

10. The method according to claim 1, wherein the first pose information is determined based on first three-dimensional (3D) point cloud information corresponding to the first object in a digital map, or the second pose information is determined based on corresponding second 3D point cloud information of the target object in the digital map, and a point cloud density of the second 3D point cloud information is higher than a point cloud density of the first 3D point cloud information.

11. A pose determining method, comprising:

obtaining first pose information, wherein the first pose information is determined based on a first image, and the first pose information indicates a corresponding pose in which a terminal captures the first image;

obtaining a location of the terminal;

determining a target object, based on the location of the terminal, in association with the first pose information satisfying a pose anomaly condition, wherein the target object is around the location of the terminal, and the target object is not in the first image; and sending information about the target object to the terminal, wherein the target object is used to obtain second pose information, the second pose information indicates a corresponding pose in which the terminal photographs the target object, the second pose information does not satisfy the pose anomaly condition, the first image includes a first object used to determine the first pose information, and a texture feature of the target object has a higher recognition degree than a texture feature of the first object.

12. The method according to claim 11, further comprising:

obtaining a target image sent by the terminal, wherein the target image includes the target object; and obtaining the second pose information based on the target image, and sending the second pose information to the terminal.

13. The method according to claim 11, wherein the information about the target object includes at least one of: a location of the target object, and an image, a name, and a category of the target object.

14. The method according to claim 11, wherein the target object is a landmark object, capable of being completely photographed under a current photographing parameter of the terminal, whose physical location is relatively fixed.

15. The method according to claim 11, wherein the first pose information is determined based on first three-dimensional (3D) point cloud information corresponding to the first object in a digital map, or the second pose information is determined based on corresponding second 3D point cloud information of the target object in the digital map, and a point cloud density of the second 3D point cloud information is higher than a point cloud density of the first 3D point cloud information.

16. The method according to claim 11, wherein the pose anomaly condition comprises:

pose information is unavailable, or a deviation between currently determined pose information and correct pose information is greater than a threshold.

17. The method according to claim 11, wherein determining the target object based on the location of the terminal comprises:

determining, from the digital map based on the location of the terminal, the target object that meets a specified condition, wherein the digital map includes a plurality of objects, the plurality of objects are around the location of the terminal, and the specified condition includes at least one of:

at least one object in the plurality of objects is closer to the location of the terminal, at least one object randomly determined in the plurality of objects, at least one object in the plurality of objects, wherein no other obstacle exists between the at least one object and the location of the terminal, or at least one object that is in the plurality of objects and to which the terminal needs to move from the location for a shorter distance.

18. The method according to claim 12, wherein obtaining the second pose information based on the target image comprises:

obtaining a first pixel location of the target object in the target image;

obtaining first location information corresponding to the target object in the digital map, wherein the first location information indicates a location of the target object in the digital map; and determining the second pose information based on the first pixel location and the first location information.

19. A pose determining apparatus, comprising:

a processor; and a memory configured to store computer readable instructions that, when executed by the processor, cause the apparatus to:

obtain a first image;

determine first pose information based on the first image, wherein the first pose information indicates a corresponding pose in which a terminal captures the first image; and display prompt information, for indicating to photograph a target object, based on the first pose information satisfying a pose anomaly condition, wherein the target object is around a location of the terminal, the target object is not in the first image, the target object is used to obtain second pose information, the second pose information indicates a corresponding pose in which the terminal photographs the target object, the second pose information does not satisfy the pose anomaly condition, the first image includes a first object used to determine the first pose information, and a texture feature of the target object has a higher recognition degree than a texture feature of the first object.

20. The pose determining apparatus according to claim 19, wherein the first pose information is determined based on first three-dimensional (3D) point cloud information corresponding to the first object in a digital map, or the second pose information is determined based on corresponding second 3D point cloud information of the target object in the digital map, and a point cloud density of the second 3D point cloud information is higher than a point cloud density of the first 3D point cloud information.

* * * * *